US012641584B2

(12) United States Patent
Park et al.

(10) Patent No.: US 12,641,584 B2
(45) Date of Patent: May 26, 2026

(54) METHOD AND APPARATUS FOR CONFIGURING SPACE REUSE FIELD IN WLAN SYSTEM

(71) Applicant: LG ELECTRONICS INC., Seoul (KR)

(72) Inventors: Eunsung Park, Seoul (KR); Jinyoung Chun, Seoul (KR); Jinsoo Choi, Seoul (KR); Dongguk Lim, Seoul (KR); Jeongki Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 348 days.

(21) Appl. No.: 18/272,317

(22) PCT Filed: Jan. 11, 2022

(86) PCT No.: PCT/KR2022/000433
§ 371 (c)(1),
(2) Date: Jul. 13, 2023

(87) PCT Pub. No.: WO2022/158779
PCT Pub. Date: Jul. 28, 2022

(65) Prior Publication Data
US 2024/0080824 A1    Mar. 7, 2024

(30) Foreign Application Priority Data

Jan. 21, 2021    (KR) ........................ 10-2021-0008429
Feb. 1, 2021    (KR) ........................ 10-2021-0014227

(51) Int. Cl.
*H04W 72/0453*    (2023.01)
*H04L 5/00*    (2006.01)
(Continued)

(52) U.S. Cl.
CPC ....... *H04W 72/0453* (2013.01); *H04L 5/0094* (2013.01); *H04L 27/2602* (2013.01); *H04W 84/12* (2013.01)

(58) Field of Classification Search
CPC .................................................. H04W 72/0453
See application file for complete search history.

(56) References Cited

U.S. PATENT DOCUMENTS 10,320,545 B2    6/2019    Choi et al.
10,397,955 B2    8/2019    Park
(Continued)

OTHER PUBLICATIONS

European Patent Office Application Serial No. 22742755.6, Search Report dated Nov. 27, 2024, 12 pages.
(Continued)

*Primary Examiner* — Jason E Mattis
(74) *Attorney, Agent, or Firm* — LEE, HONG, DEGERMAN, KANG & WAIMEY

(57) ABSTRACT

Proposed are a method and an apparatus for configuring a space reuse field in a WLAN system. Specifically, a receiving STA receives a trigger frame from a transmitting STA. The receiving STA transmits a TB PPDU to the transmitting STA through a 320 MHz band. The trigger frame includes first and second non-HT Dup PPDUs. In a first non-HT Dup PPDU, all fields are copied and transmitted for each 20 MHz channel over a first 160 MHz channel having a low frequency within a 320 MHz band. In a second non-HT Dup PPDU, all fields are copied and transmitted for each 20 MHz channel over a second 160 MHz channel having a high frequency within the 320 MHz band. The first non-HT Dup PPDU includes a first common information field and a first
(Continued)

special user information field. The second non-HT Dup PPDU includes a second common information field and a second special user information field.

15 Claims, 25 Drawing Sheets

(51) Int. Cl.
  *H04L 27/26*  (2006.01)
  *H04W 84/12*  (2009.01)

(56)  References Cited

U.S. PATENT DOCUMENTS

| | | | |
|---|---|---|---|
| 2016/0113009 A1 | 4/2016 | Seok | |
| 2019/0334590 A1* | 10/2019 | Son | H04L 5/0048 |
| 2022/0030625 A1* | 1/2022 | Yang | H04L 5/001 |
| 2023/0130569 A1* | 4/2023 | Kim | H04L 5/0092 |
| | | | 370/329 |
| 2023/0284041 A1* | 9/2023 | Yu | H04L 5/0044 |
| | | | 370/329 |
| 2023/0328718 A1* | 10/2023 | Yu | H04W 28/26 |
| | | | 370/329 |
| 2024/0064047 A1* | 2/2024 | Park | H04L 5/0064 |
| 2024/0106585 A1* | 3/2024 | Lou | H04L 5/0023 |

OTHER PUBLICATIONS

Edward Au, "Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 8: Enhancements for extremely high throughput (EHT)," IEEE P802.11be/D1.0, May 2021, pp. 1-2, 40, 89-90, 102, 400, 410, 425, 452-453 and 613.
PCT International Application No. PCT/KR2022/000433, International Search Report dated Apr. 11, 2022, 3 pages.
Huawei Technologies, Co. Ltd, "Backward compatible EHT trigger frame follow up," IEEE 802.11-20/1808-04-00be, Nov. 2020, 22 pages.
Qualcomm, "Enhanced Trigger Frame for EHT Support," IEEE 802.11-20/1429r4, Jan. 2021, 35 pages.
Qualcomm, "IEEE802.11ax Background Compatible Trigger Frame RU Allocation Table," IEEE 802.11-20/1703r6, Jan. 2021, 25 pages.
Huawei, "BW indication of 320MHz for non-HT and non-HT duplicate frames," IEEE 802.11-20/0616r0, Apr. 2020, 10 pages.

* cited by examiner

FIG. 1
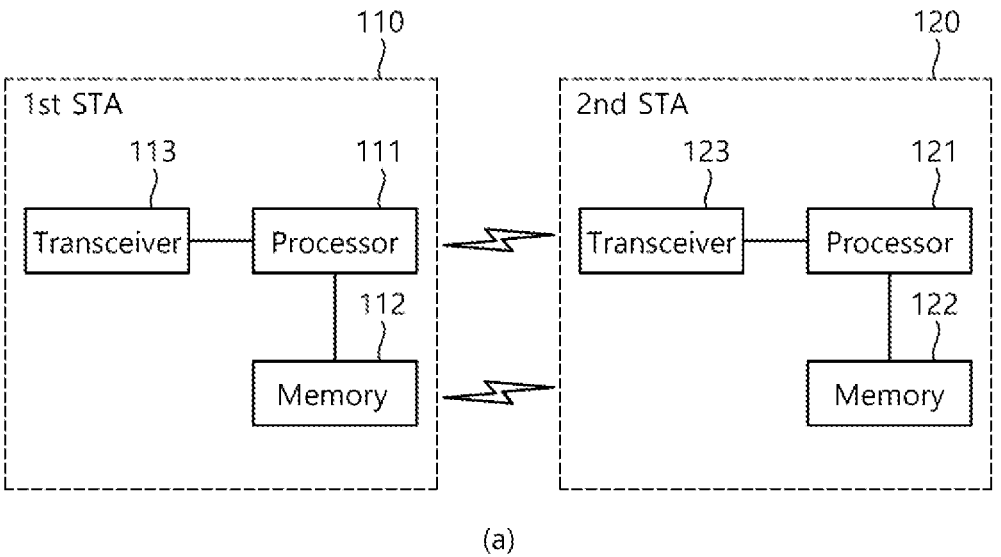
(a)
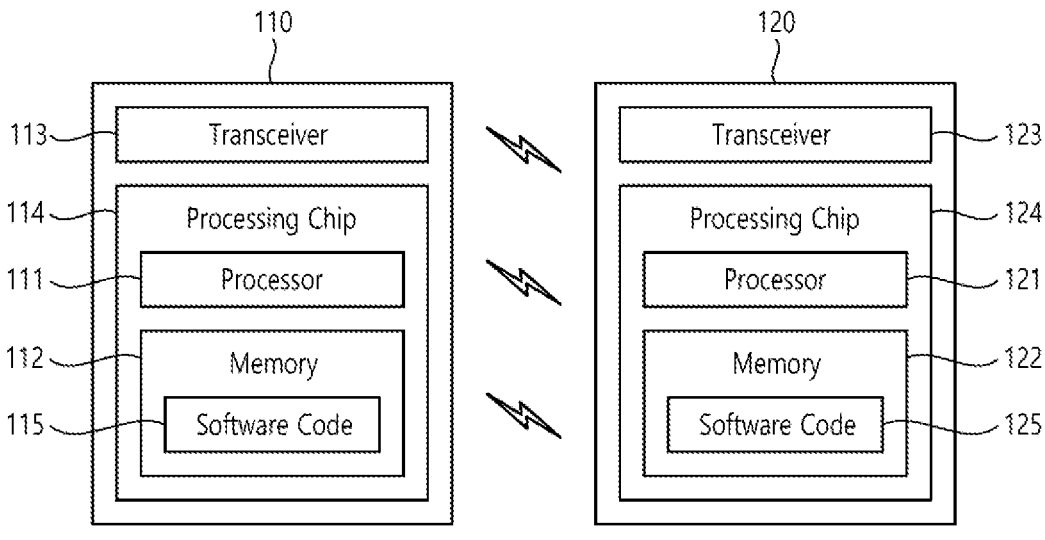
(b)

FIG. 2
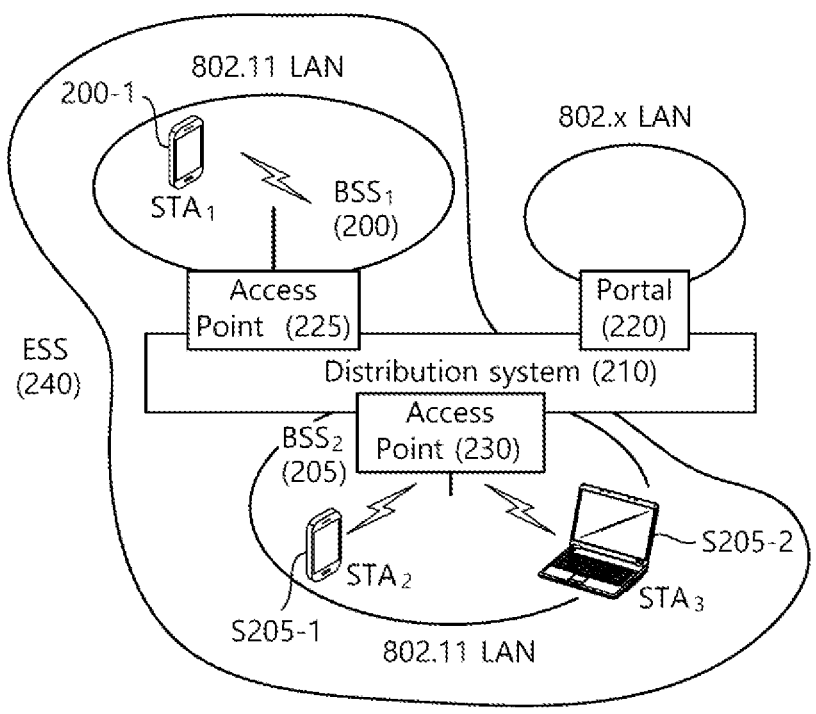
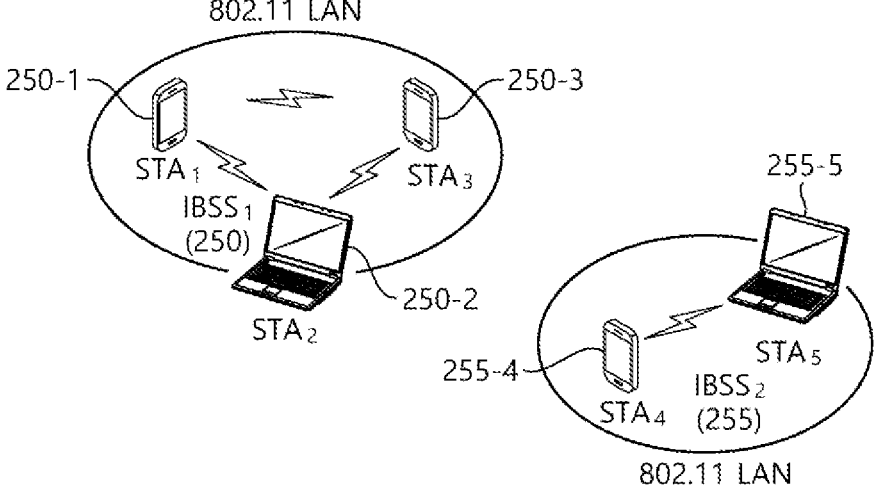

FIG. 4

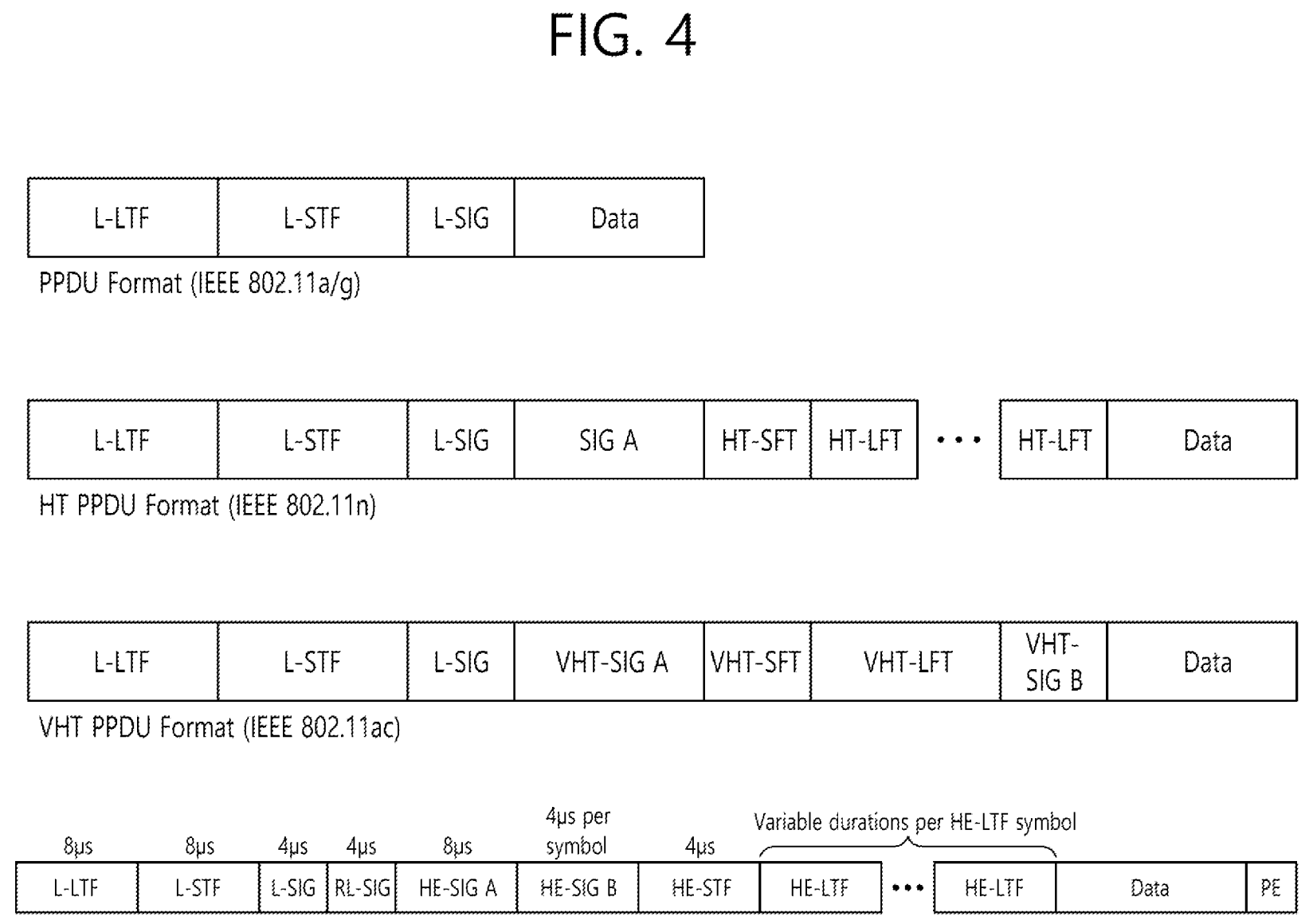

| L-LTF | L-STF | L-SIG | Data |
|---|---|---|---|

PPDU Format (IEEE 802.11a/g)

| L-LTF | L-STF | L-SIG | SIG A | HT-SFT | HT-LFT | • • • | HT-LFT | Data |
|---|---|---|---|---|---|---|---|---|

HT PPDU Format (IEEE 802.11n)

| L-LTF | L-STF | L-SIG | VHT-SIG A | VHT-SFT | VHT-LFT | VHT-SIG B | Data |
|---|---|---|---|---|---|---|---|

VHT PPDU Format (IEEE 802.11ac)

| 8μs | 8μs | 4μs | 4μs | 8μs | 4μs per symbol | 4μs | | Variable durations per HE-LTF symbol | | | |
|---|---|---|---|---|---|---|---|---|---|---|---|
| L-LTF | L-STF | L-SIG | RL-SIG | HE-SIG A | HE-SIG B | HE-STF | HE-LTF | • • • | HE-LTF | Data | PE |

FIG. 10

| L-STF | L-LTF | L-SIG | RL-SIG | U-SIG | EHT-SIG | EHT-STF | EHT-LTF | Data |
|-------|-------|-------|--------|-------|---------|---------|---------|------|

FIG. 16

| B0    B3 | B4    B15 | B16 | B17 | B18    B19 | B20    B21 | B22 | B23    B25 |
|---|---|---|---|---|---|---|---|
| Trigger Type | UL Length | More TF | CS required | UL BW | GI and HE-LTF Type/ TXOP Sharing Mode | MU-MIMO HE-LTF Mode | Number of HE-LTF Symbols And Midamble Periodicity |
| 4 | 12 | 1 | 1 | 2 | 2 | 1 | 4 |

Bits:

| B26 | B27 | B28    B33 | B34    B35 | B36 | B37    B52 | B53 | B54    B62 |
|---|---|---|---|---|---|---|---|
| UL STBC | LDPC Extra Symbol Segment | AP Tx Power | Pre-FEC Padding Factor | PE Disambiguity | UL Spatial Reuse | Doppler | UL HE-SIG-A2 Reserved |
| 1 | 1 | 6 | 2 | 1 | 16 | 1 | 9 |

Bits:

| B63 | |
|---|---|
| Reserved | Trigger Dependent Common info |
| 1 | variable |

Bits:

FIG. 17

| B0   B3 | B4          B15 | B16 | B17 | B18          B19 | B20          B21 | B22 | B23          B25 |
|---|---|---|---|---|---|---|---|
| Trigger Type | UL Length | More TF | CS required | UL BW | GI and HE-LTF Type/ TXOP Sharing Mode | MU-MIMO HE-LTF Mode | Number of EHT-LTF Symbols And Midamble Periodicity |
| 4 | 12 | 1 | 1 | 2 | 2 | 1 | 3 |

Bits:

| B26 | B27 | B28          B33 | B34          B35 | B36 | B37          B52 | B53 | B54          B62 |
|---|---|---|---|---|---|---|---|
| UL STBC | LDPC Extra Symbol Segment | AP Tx Power | Pre-FEC Padding Factor | PE Disambiguity | UL Spatial Reuse | Doppler | HE/EHT P160 |
| 1 | 1 | 6 | 2 | 1 | 16 | 1 | 1 |

Bits:

| B55 | B56          B62 | B63 | |
|---|---|---|---|
| Special User Info Field Present | Reserved | Reserved | Trigger Dependent Common Info |
| 1 | 7 | 1 | variable |

Bits:

FIG. 18

| B0     B3 | B4     B7 | B8     B11 | B12     B15 |
|---|---|---|---|
| Spatial Reuse 1 | Spatial Reuse 2 | Spatial Reuse 3 | Spatial Reuse 4 |

Bits:     4     4     4     4

FIG. 19

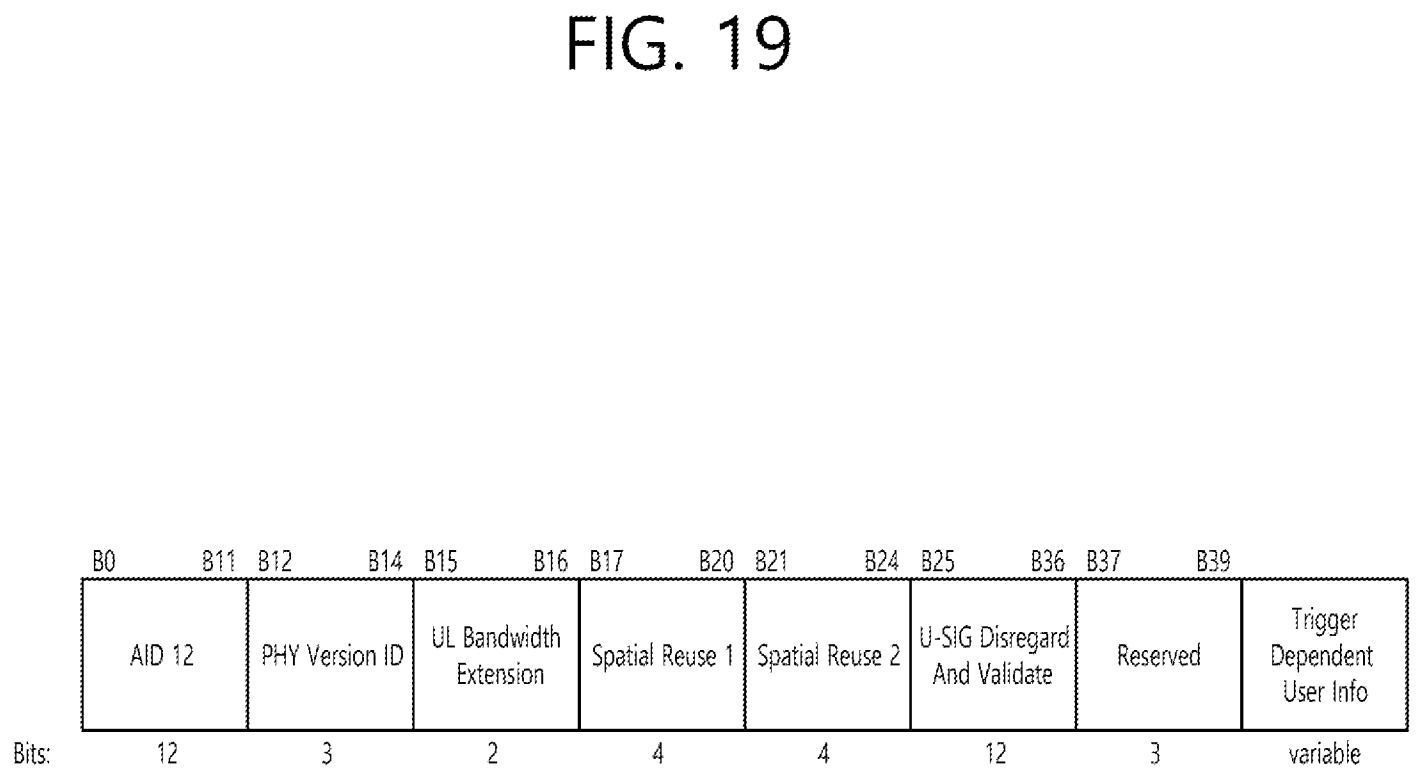

| AID 12 | PHY Version ID | UL Bandwidth Extension | Spatial Reuse 1 | Spatial Reuse 2 | U-SiG Disregard And Validate | Reserved | Trigger Dependent User Info |
|--------|----------------|------------------------|-----------------|-----------------|------------------------------|----------|-----------------------------|
| 12 | 3 | 2 | 4 | 4 | 12 | 3 | variable |

Bits:

FIG. 20

| B0    B11 | B12    B19 | B20 | B21    B24 | B25 | B26    B31 | B32    B38 | B39 |  |
|-----------|-----------|-----------------|-----------|----------|---------------------------------|---------------------------|-------|---------------------------------|
| AID 12 | RU Allocation | UL FEC Coding Type | UL EHT-MCS | Reserved | SS Allocation/ RA-RU Information | UL Target Receive Power | PS160 | Trigger Dependent User Info |
| Bits:    12 | 8 | 1 | 4 | 1 | 6 | 7 | 1 | variable |

TB A-PPDU transmitting, by a transmitting station
(STA), a trigger frame to a receiving STA          ⌐S2410 receiving, by the transmitting STA, a Trigger Based
Physical Protocol Data Unit (TB PPDU) from the          ⌐S2420
receiving STA through a 320 MHz band receiving, by a receiving station (STA), a trigger frame from a transmitting STA — S2510 transmitting, by the receiving STA, a Trigger Based Physical Protocol Data Unit (TB PPDU) through a 320 MHz band to the transmitting STA — S2520

METHOD AND APPARATUS FOR CONFIGURING SPACE REUSE FIELD IN WLAN SYSTEM

CROSS-REFERENCE TO RELATED APPLICATIONS

This application is the National Stage filing under 35 U.S.C. 371 of International Application No. PCT/KR2022/000433, filed on Jan. 11, 2022, which claims the benefit of earlier filing date and right of priority to Korean Application Nos. 10-2021-0008429, filed on Jan. 21, 2021, and 10-2021-0014227, filed on Feb. 1, 2021, the contents of which are all hereby incorporated by reference herein in their entireties.

TECHNICAL FIELD

The present specification relates to a method for configuring a spatial reuse field in a WLAN system, and more particularly, to a method and apparatus for configuring a trigger frame and a TB PPDU supporting spatial reuse in two WLAN systems.

BACKGROUND

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

In a new WLAN standard, an increased number of spatial streams may be used. In this case, in order to properly use the increased number of spatial streams, a signaling technique in the WLAN system may need to be improved.

SUMMARY

The present specification proposes a method and apparatus for configuring a trigger frame and a TB PPDU supporting spatial reuse in a WLAN system.

An example of the present specification proposes a method for configuring a trigger frame and a TB PPDU supporting spatial reuse.

The present embodiment may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward compatibility with the 802.11ax system.

This embodiment proposes a method for configuring a trigger frame and a TB PPDU simultaneously supporting spatial reuse of an 802.11ax (or HE) WLAN system and an 802.11be (or EHT) WLAN system.

A receiving station (STA) receives a trigger frame from a transmitting STA.

The receiving STA transmits a Trigger Based Physical Protocol Data Unit (TB PPDU) to the transmitting STA through a 320 MHz band.

The trigger frame includes first and second non-High Throughput Duplicate (non-HT Dup) PPDUs. In the first non-HT Dup PPDU, all fields in a first 160 MHz channel having a lower frequency in the 320 MHz band are duplicated and transmitted every 20 MHz channel. In the second non-HT Dup PPDU, all fields in a second 160 MHz channel having a higher frequency in the 320 MHz band are duplicated and transmitted every 20 MHz channel. That is, the trigger frame is configured using a partial non-HT Dup PPDU, and the Partial non-HT Dup PPDU indicates a PPDU transmitted by using two or more Non-HT Dup PPDUs in a channel of 160 MHz or less. That is, this embodiment proposes a method in which two trigger frames are transmitted for each 160 MHz channel in the entire 320 MHz band.

The first non-HT Dup PPDU includes a first common information field and a first special user information field, and the second non-HT Dup PPDU includes a second common information field and a second special user information field.

Structures of the first and second non-HT Dup PPDUs are specifically as follows.

The first common information field includes first to fourth spatial reuse fields, and the second common information field includes fifth to eighth spatial reuse fields. The first special user information field includes ninth and tenth spatial reuse fields, and the second special user information field includes eleventh and twelfth spatial reuse fields.

This embodiment assumes a situation in which the trigger frame triggers the EHT TB PPDU. The first and second common information fields are EHT variant Common Info fields, and each includes four spatial reuse fields (HSR1, HSR2, HSR3, and HSR4). The four spatial reuse fields (HSR1, HSR2, HSR3, and HSR4) are defined for spatial reuse of an OBSS HE STA. The first and second special user information fields are included in the trigger frame when an Association Identifier (AID) is 2007, and each includes two spatial reuse fields (ESR1 and ESR2). The two spatial reuse fields (ESR1 and ESR2) are defined for spatial reuse of an OBSS EHT STA.

However, a value of the eleventh spatial reuse field is set equal to a value of the ninth spatial reuse field. A value of the twelfth spatial reuse field is set equal to a value of the tenth spatial reuse field. That is, the special user information field may be identically set for the first and second non-HT Dup PPDUs.

The first to fourth spatial reuse fields are set to values of the ninth and eleventh spatial reuse fields (HSR1=HSR2=HSR3=HSR4=ESR1). The fifth to eighth spatial reuse fields are set to values of the tenth and twelfth spatial reuse fields (HSR1=HSR2=HSR3=HSR4=ESR2).

According to the embodiment proposed in this specification, since the first and second non-HT Dup PPDUs included in the trigger frame are configured differently for each 160 MHz channel, when the TB PPDU is a Trigger Based Aggregated-Physical Protocol Data Unit (TB A-PPDU) in which a High Efficiency (HE) TB PPDU and an Extreme High Throughput (EHT) TB PPDU are aggregated, since the trigger frame can indicate the HE TB PPDU and the EHT TB PPDU, respectively, there is an effect that structurally efficient configuration is possible. In addition, since the maximum bandwidth supported by the HE STA is 160 MHz, considering this, a structure of a trigger frame using a partial non-HT Dup PPDU in a 160 MHz channel or less may be preferable. In addition, this embodiment can set the spatial reuse field included in the common information field using all values (ESR1, ESR2) of the spatial reuse field included in the special user information field. Therefore, it has the effect of improving overall throughput and efficiency by enabling spatial reuse of OBSS HE STAs according to the ESR value.

BRIEF DESCRIPTION OF THE DRAWINGS

FIG. 1 shows an example of a transmitting apparatus and/or receiving apparatus of the present specification.

FIG. 2 is a conceptual view illustrating the structure of a wireless local area network (WLAN).

FIG. 4 illustrates an example of a PPDU used in an IEEE standard.

FIG. 10 illustrates an example of a PPDU used in the present specification.

FIG. 16 shows an example of a common information field of a trigger frame.

FIG. 17 shows another example of a common information field of a trigger frame.

FIG. 18 shows a format of a UL Spatial Reuse subfield.

FIG. 19 shows an example of a Special User Info field format.

FIG. 20 shows an example of an EHT User Info field format.

DETAILED DESCRIPTION

Figure 3:
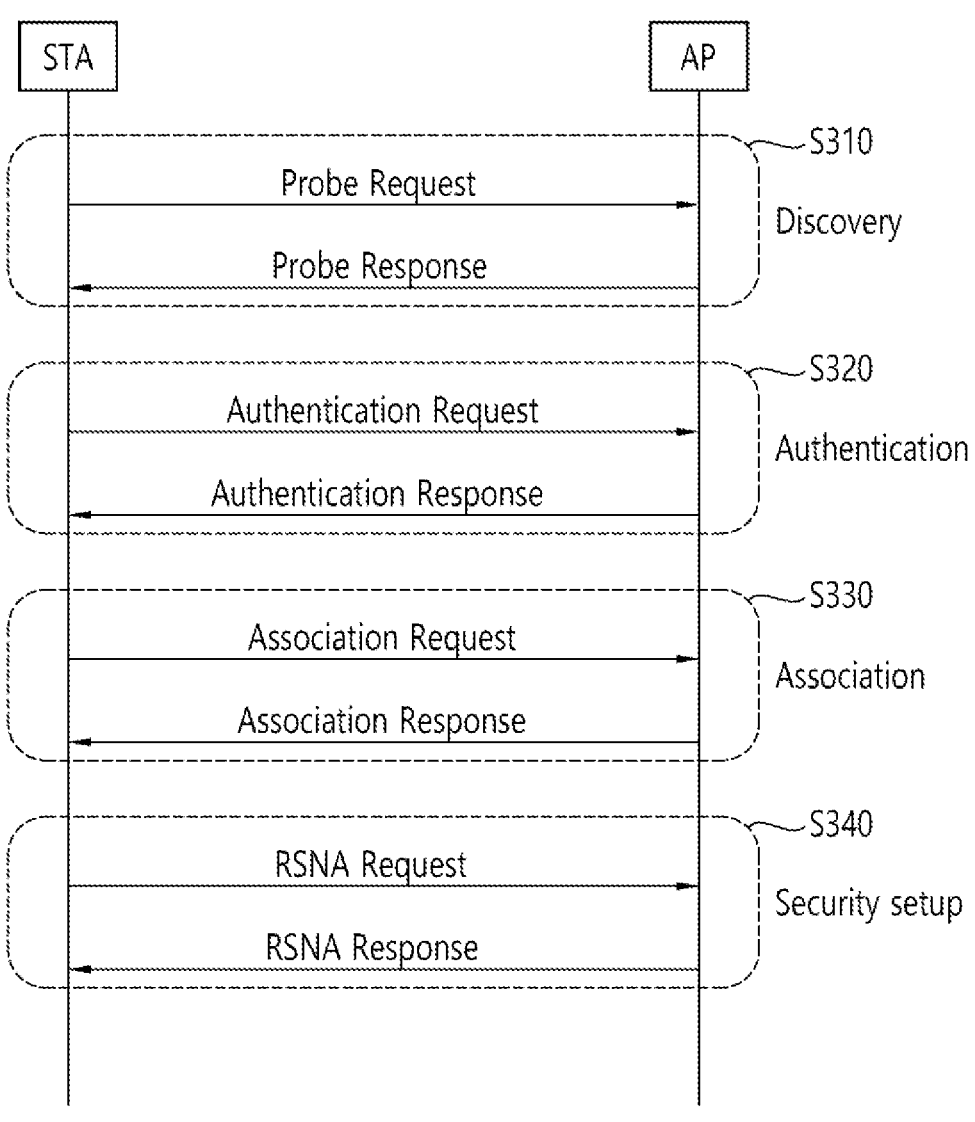
FIG. 3 illustrates a general link setup process.

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a $3^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
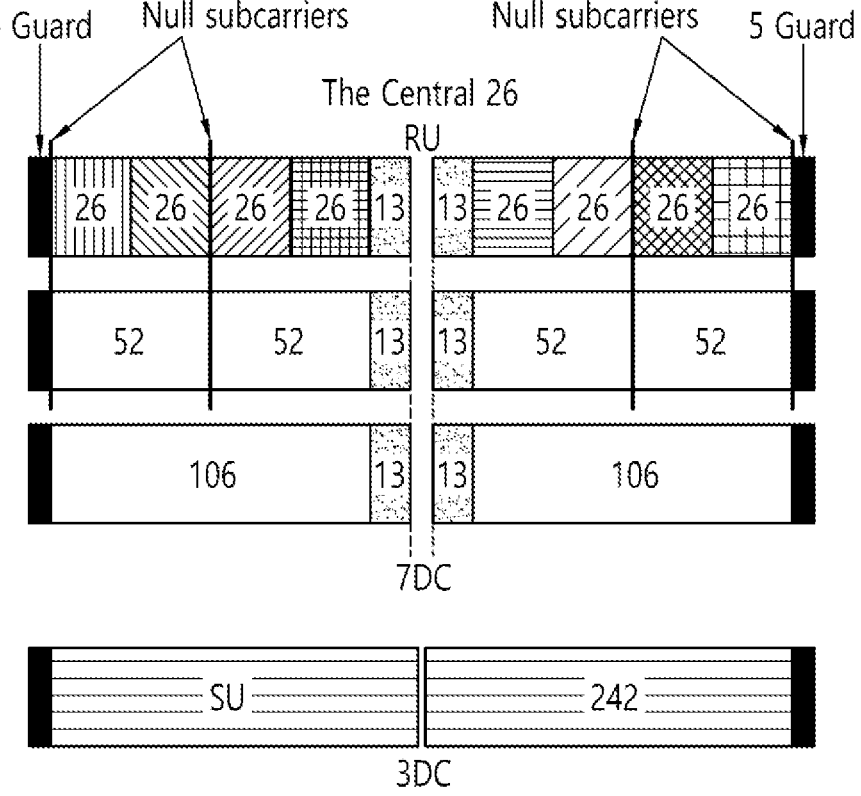
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
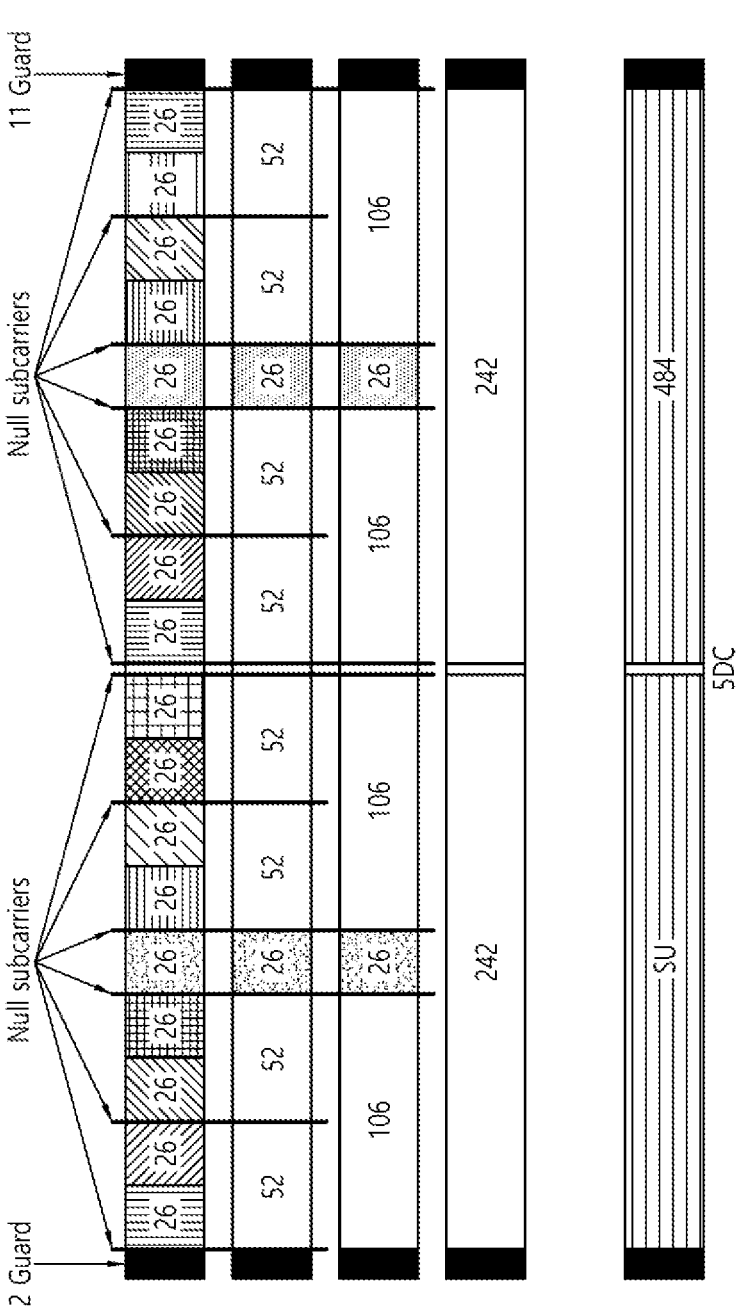
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
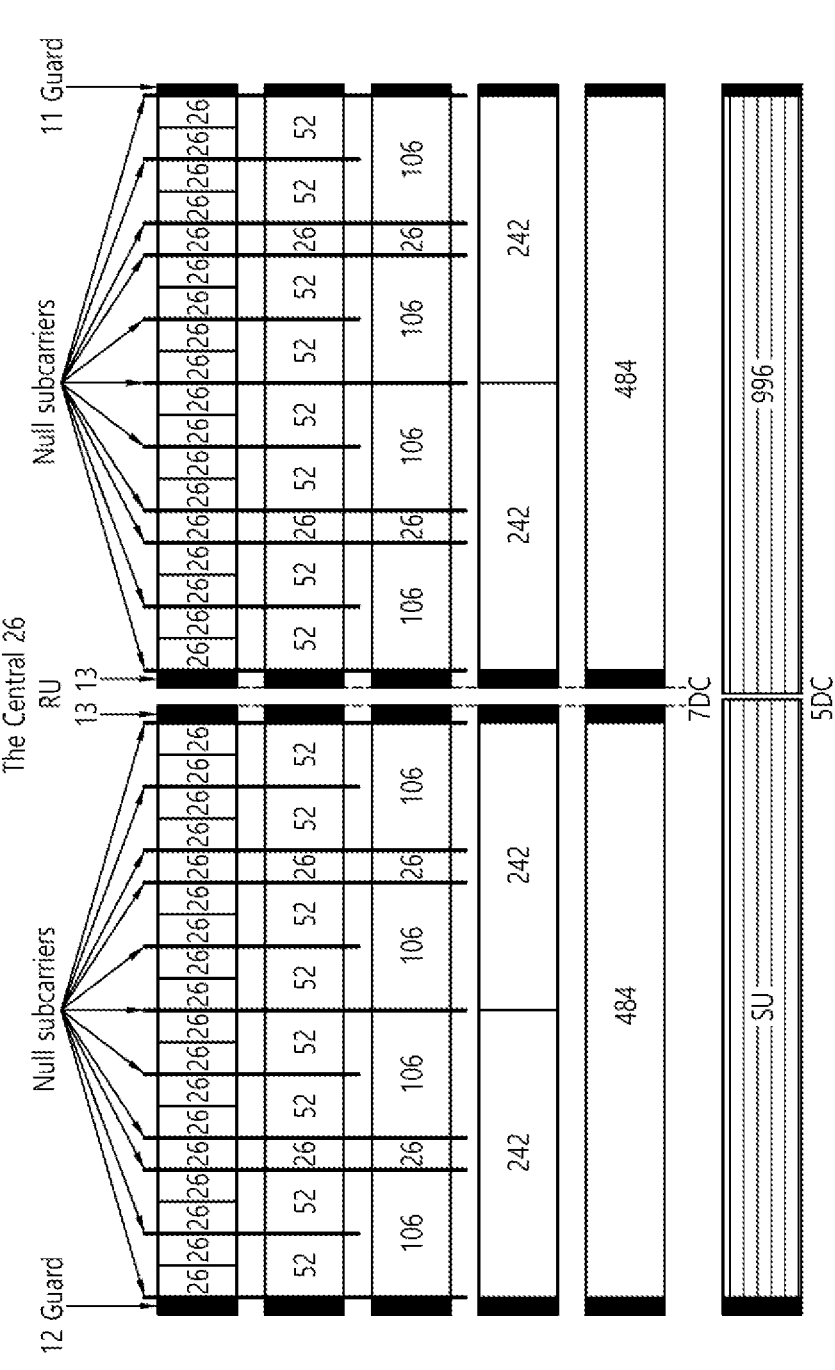
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
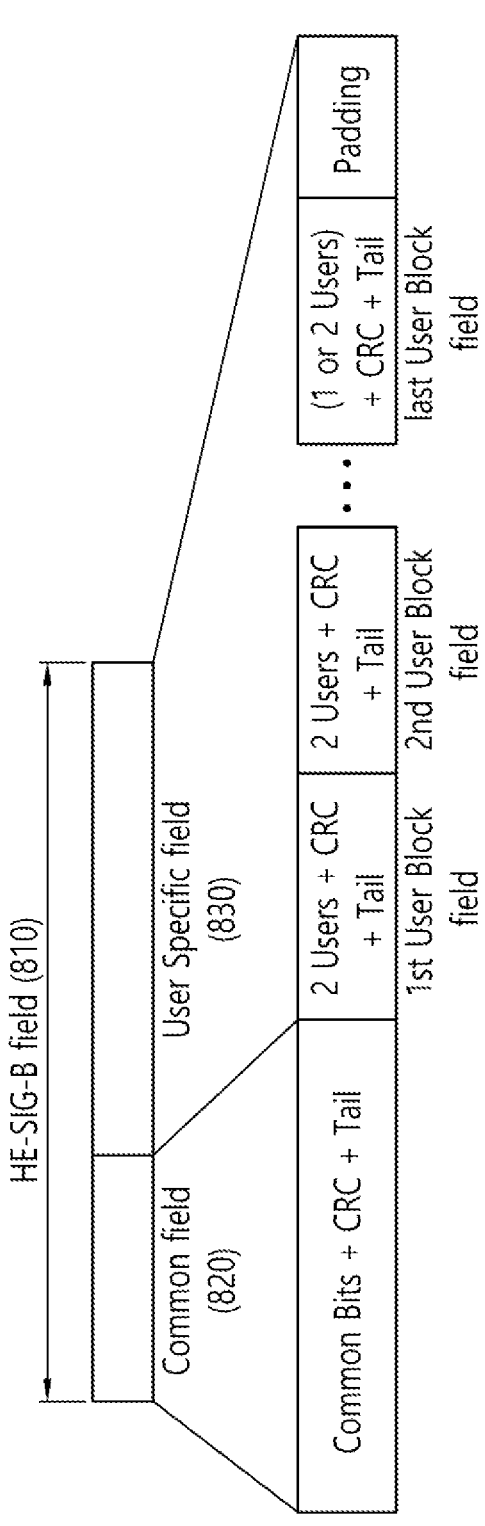
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | | 52 | | 26 | 26 | 26 | 26 | 26 | 26 | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ | | 106 | | | 26 | 26 | 26 | 26 | 26 | 8 |
| 01001$y_2y_1y_0$ | | 106 | | | 26 | 26 | 26 | 52 | | 8 |

"01000$y_2y_1y_0$" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information (y2y1y0). For example, when the 3-bit information (y2y1y0) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000y2y1y0", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
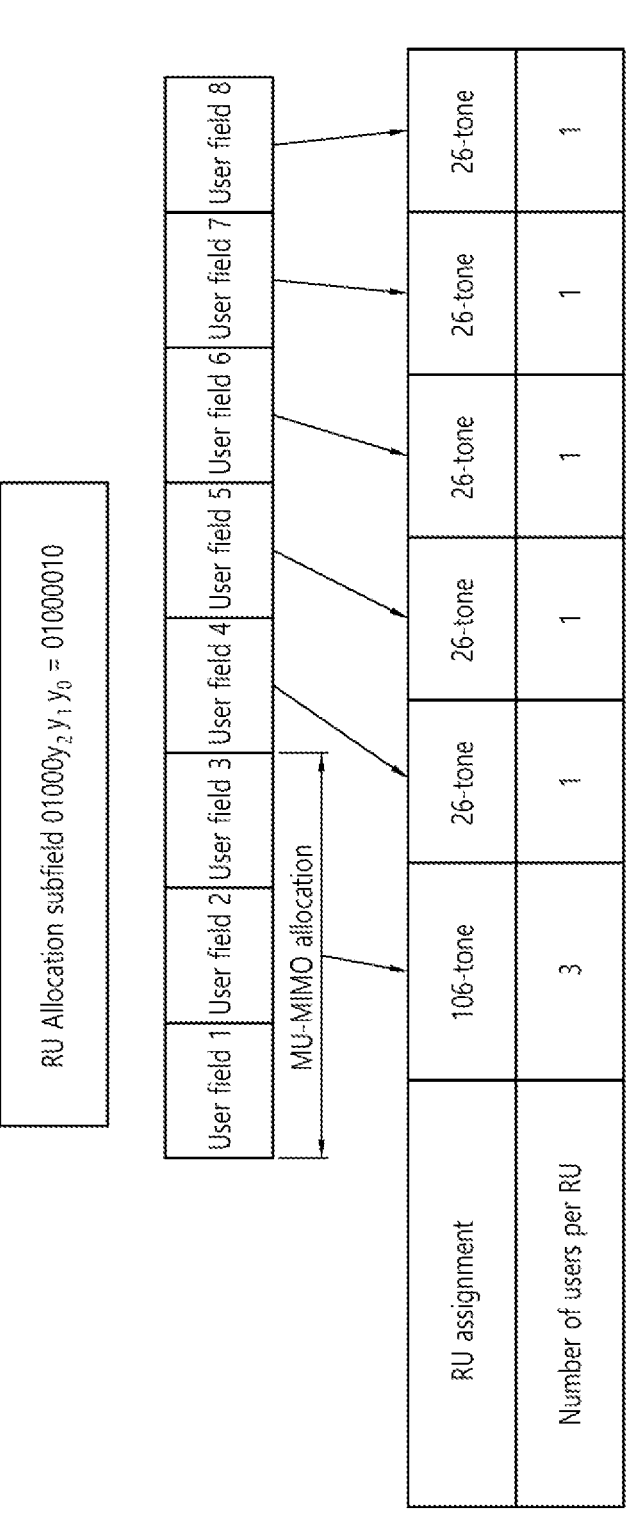
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration.

In addition, a third bit (i.e., B15-18) in the user field (i.e., 21 bits) may include modulation and coding scheme (MCS)

information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., 1/2, 2/3, 3/4, 5/6e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Hereinafter, a PPDU transmitted/received in a STA of the present specification will be described.

Figure 10:
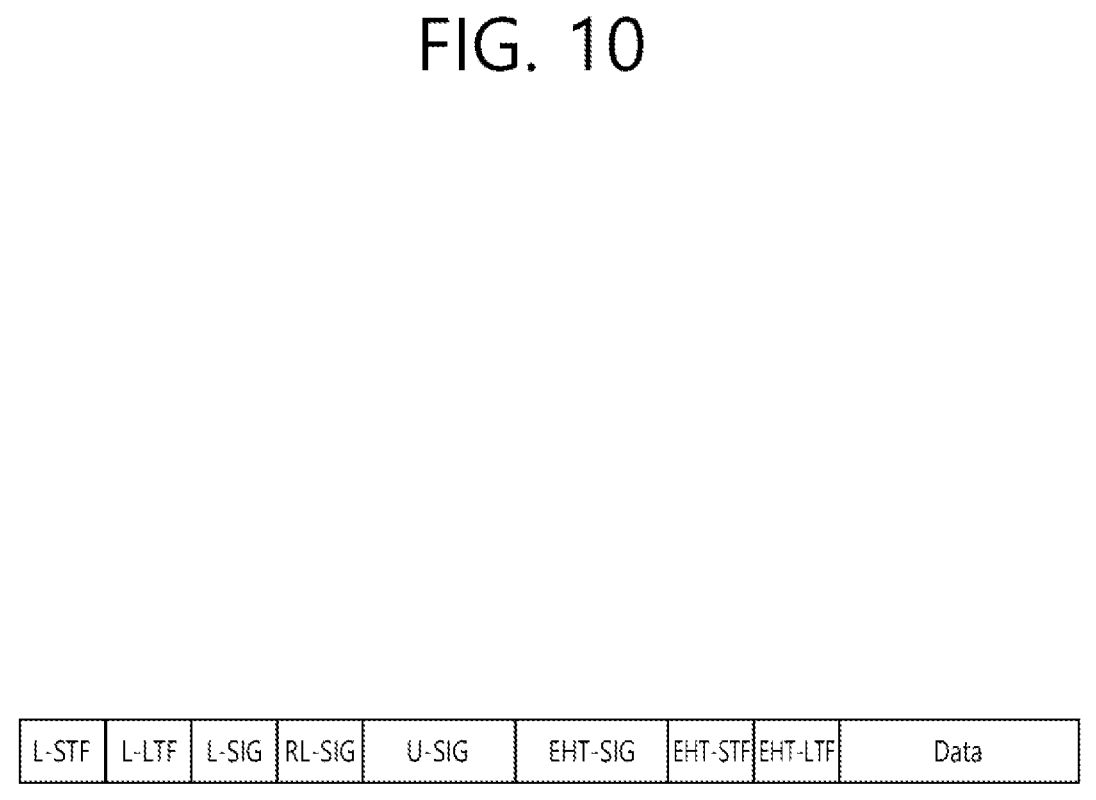

FIG. 10 illustrates an example of a PPDU used in the present specification.

The PPDU of FIG. 10 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 10 may indicate the entirety or part of a PPDU type used in the EHT system. For example, the example of FIG. 10 may be used for both of a single-user (SU) mode and a multi-user (MU) mode. In other words, the PPDU of FIG. 10 may be a PPDU for one receiving STA or a plurality of receiving STAs. When the PPDU of FIG. 10 is used for a trigger-based (TB) mode, the EHT-SIG of FIG. 10 may be omitted. In other words, an STA which has received a trigger frame for uplink-MU (UL-MU) may transmit the PPDU in which the EHT-SIG is omitted in the example of FIG. 10.

In FIG. 10, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 10 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 10, the L-LTE and the L-STF may be the same as those in the conventional fields.

The L-SIG field of FIG. 10 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier {subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index{−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 10. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 μs. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=1/2 to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 10. The preamble puncturing implies that puncturing is applied to part (e.g., a secondary 20 MHz band) of the full band. For example, when an 80 MHz PPDU is transmitted, an STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 10 may include control information for the receiving STA. The EHT-SIG may be transmitted through at least one symbol, and one symbol may have a length of 4 µs. Information related to the number of symbols used for the EHT-SIG may be included in the U-SIG.

The EHT-SIG may include a technical feature of the HE-SIG-B described with reference to FIG. 8 and FIG. 9. For example, the EHT-SIG may include a common field and a user-specific field as in the example of FIG. 8. The common field of the EHT-SIG may be omitted, and the number of user-specific fields may be determined based on the number of users.

As in the example of FIG. 8, the common field of the EHT-SIG and the user-specific field of the EHT-SIG may be individually coded. One user block field included in the user-specific field may include information for two users, but a last user block field included in the user-specific field may include information for one user. That is, one user block field of the EHT-SIG may include up to two user fields. As in the example of FIG. 9, each user field may be related to MU-MIMO allocation, or may be related to non-MU-MIMO allocation.

As in the example of FIG. 8, the common field of the EHT-SIG may include a CRC bit and a tail bit. A length of the CRC bit may be determined as 4 bits. A length of the tail bit may be determined as 6 bits, and may be set to '000000'.

As in the example of FIG. 8, the common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in Table 1.

A mode in which the common field of the EHT-SIG is omitted may be supported. The mode in the common field of the EHT-SIG is omitted may be called a compressed mode. When the compressed mode is used, a plurality of users (i.e., a plurality of receiving STAs) may decode the PPDU (e.g., the data field of the PPDU), based on non-OFDMA. That is, the plurality of users of the EHT PPDU may decode the PPDU (e.g., the data field of the PPDU) received through the same frequency band. Meanwhile, when a non-compressed mode is used, the plurality of users of the EHT PPDU may decode the PPDU (e.g., the data field of the PPDU), based on OFDMA. That is, the plurality of users of the EHT PPDU may receive the PPDU (e.g., the data field of the PPDU) through different frequency bands.

The EHT-SIG may be configured based on various MCS schemes. As described above, information related to an MCS scheme applied to the EHT-SIG may be included in U-SIG. The EHT-SIG may be configured based on a DCM scheme. For example, among N data tones (e.g., 52 data tones) allocated for the EHT-SIG, a first modulation scheme may be applied to half of consecutive tones, and a second modulation scheme may be applied to the remaining half of the consecutive tones. That is, a transmitting STA may use the first modulation scheme to modulate specific control information through a first symbol and allocate it to half of the consecutive tones, and may use the second modulation scheme to modulate the same control information by using a second symbol and allocate it to the remaining half of the consecutive tones. As described above, information (e.g., a 1-bit field) regarding whether the DCM scheme is applied to the EHT-SIG may be included in the U-SIG. An HE-STF of FIG. 10 may be used for improving automatic gain control estimation in a multiple input multiple output (MIMO) environment or an OFDMA environment. An HE-LTF of FIG. 10 may be used for estimating a channel in the MIMO environment or the OFDMA environment.

Information related to a type of STF and/or LTF (information related to a GI applied to LTF is also included) may be included in a SIG-A field and/or SIG-B field or the like of FIG. 10.

A PPDU (e.g., EHT-PPDU) of FIG. 10 may be configured based on the example of FIG. 5 and FIG. 6.

For example, an EHT PPDU transmitted on a 20 MHz band, i.e., a 20 MHz EHT PPDU, may be configured based on the RU of FIG. 5. That is, a location of an RU of EHT-STF, EHT-LTF, and data fields included in the EHT PPDU may be determined as shown in FIG. 5.

An EHT PPDU transmitted on a 40 MHz band, i.e., a 40 MHz EHT PPDU, may be configured based on the RU of FIG. 6. That is, a location of an RU of EHT-STF, EHT-LTF, and data fields included in the EHT PPDU may be determined as shown in FIG. 6.

Since the RU location of FIG. 6 corresponds to 40 MHz, a tone-plan for 80 MHz may be determined when the pattern of FIG. 6 is repeated twice. That is, an 80 MHz EHT PPDU may be transmitted based on a new tone-plan in which not the RU of FIG. 7 but the RU of FIG. 6 is repeated twice.

When the pattern of FIG. 6 is repeated twice, 23 tones (i.e., 11 guard tones+12 guard tones) may be configured in a DC region. That is, a tone-plan for an 80 MHz EHT PPDU allocated based on OFDMA may have 23 DC tones. Unlike this, an 80 MHz EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 6 is repeated several times.

The PPDU of FIG. 10 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "modulo 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 10. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "modulo 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BP SK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 10. The PPDU of FIG. 10 may be used to transmit/receive frames of various types. For example, the PPDU of FIG. 10 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 10 may be used for a management frame. An example of the management frame may include a beacon frame, a (re-)association request frame, a (re-)association response frame, a probe request frame, and a probe response frame. For example, the PPDU of FIG. 10 may be used for a data frame. For example, the PPDU of FIG. 10 may be used to simultaneously transmit at least two or more of the control frames, the management frame, and the data frame.

Figure 11:
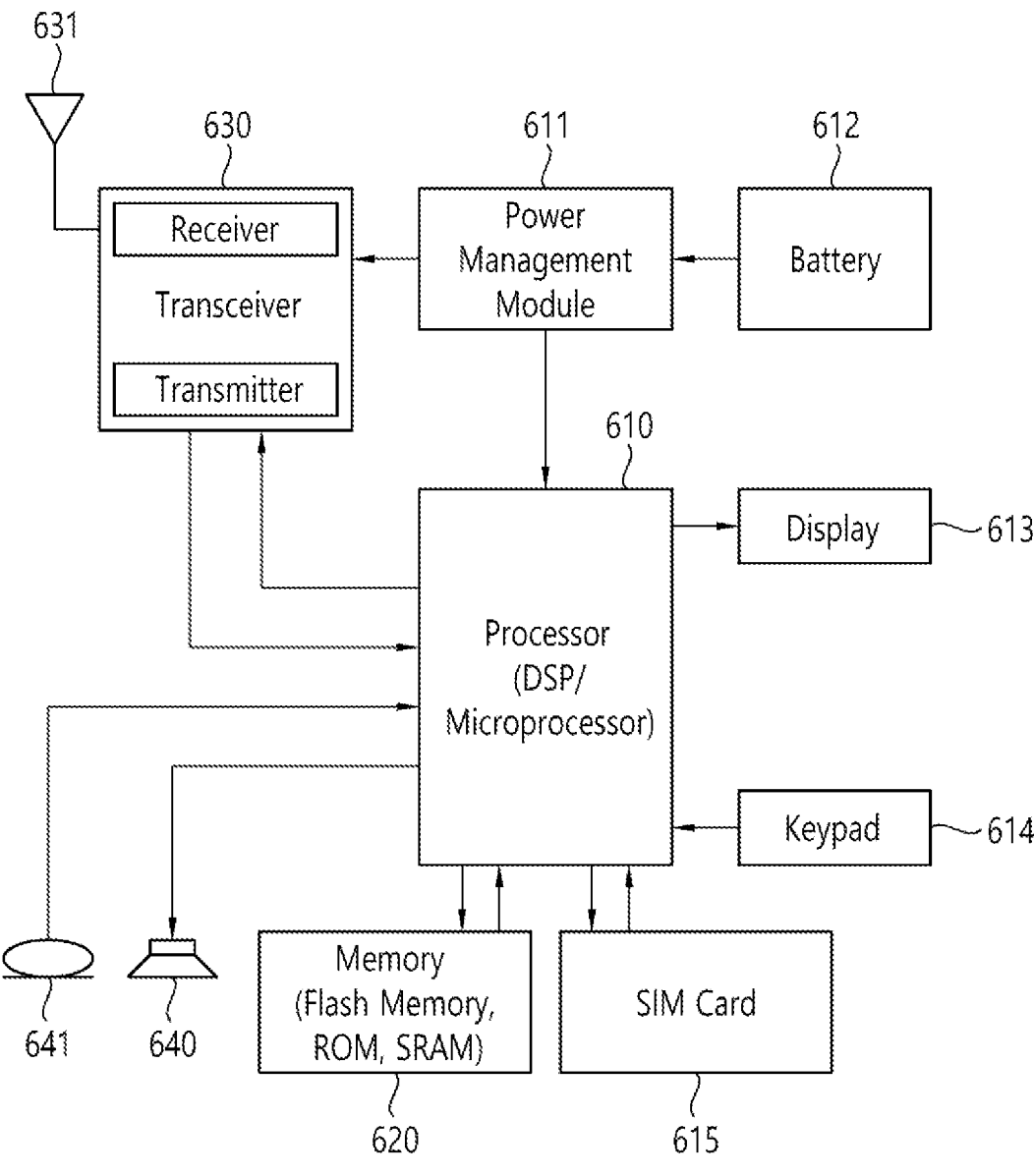
FIG. 11 illustrates an example of a modified transmission device and/or receiving device of the present specification.

FIG. 11 illustrates an example of a modified transmission device and/or receiving device of the present specification.

Each device/STA of the sub-figure (a)/(b) of FIG. 1 may be modified as shown in FIG. 11. A transceiver 630 of FIG. 11 may be identical to the transceivers 113 and 123 of FIG. 1. The transceiver 630 of FIG. 11 may include a receiver and a transmitter.

A processor 610 of FIG. 11 may be identical to the processors 111 and 121 of FIG. 1. Alternatively, the processor 610 of FIG. 11 may be identical to the processing chips 114 and 124 of FIG. 1.

A memory 620 of FIG. 11 may be identical to the memories 112 and 122 of FIG. 1. Alternatively, the memory 620 of FIG. 11 may be a separate external memory different from the memories 112 and 122 of FIG. 1.

Referring to FIG. 11, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 11, a speaker 640 may output a result related to a sound processed by the processor 610. A microphone 641 may receive an input related to a sound to be used by the processor 610.

1. Spatial Reuse (SR) Behavior

In 802.11ax wireless LAN systems, SR operation is a method of improving spectral efficiency by increasing the number of parallel transmissions. Carrier Sense Threshold (CST) adjustment for interBSS transmission detected through SR operation may be performed. CST coordination is achieved through two mechanisms: i) Overlapping Basic Service Set Packet Detect (OBSS PD)-based SR, and ii) Parametrized Spatial Reuse (PSR).

The main difference between the two mechanisms lies in the degree of collaboration between the BSSs to identify SR-based opportunities. Both mechanisms include Transmission Power Control (TPC) to limit further interference generated by simultaneous transmissions.

SR operation is introduced as a mechanism to increase the number of stored transmissions and spectral efficiency in OBSS. In some cases, dynamic sensitivity and transmit power tuning have been shown to significantly improve network performance and contribute to reducing the impact of the well-known hidden/exposed device problem. However, in some cases, modifying the CST or transmit power may exacerbate the hidden/exposed device problem by creating flow starvation and asymmetry.

Figure 12:
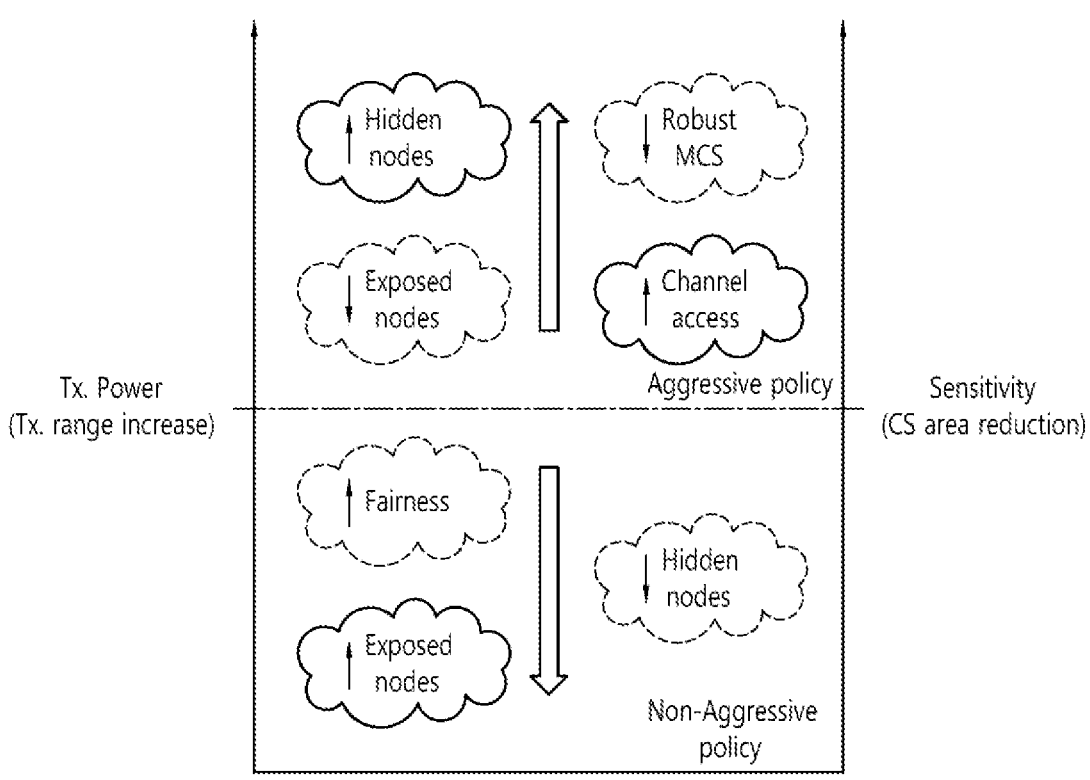
FIG. 12 is a chart showing the effect of increasing and decreasing transmit power and sensitivity in a WLAN.

FIG. 12 is a chart showing the effect of increasing and decreasing transmit power and sensitivity in a WLAN. For example, increasing the sensitivity can contribute to more frequent access to the channel because the carrier sense (CS) area is reduced. However, this may lead to observing a higher number of collisions with hidden nodes. In addition, a more robust Modulation and Coding Scheme (MCS) is required because a more aggressive channel access policy may expose the receiver to higher levels of interference.

SR operation relies on dynamic Clear Channel Assessment/Carrier Sense (CCA/CS) coordination to increase the number of transmit opportunities (TXOPs) in OBSS. The CCA/CS mechanism is triggered on a Wi-Fi device when it detects the preamble of another device transmission. A detected transmission (exceeding the physical sensitivity threshold) may not decode properly if the received signal is poor. In contrast, for decoded transmissions that exceed the CCA/CS threshold, the physical or virtual carrier sensing action sets the medium in use. The capture effect is also used when detecting multiple signals, so operation can be locked to the strongest signal without experiencing packet collisions.

Figure 13:
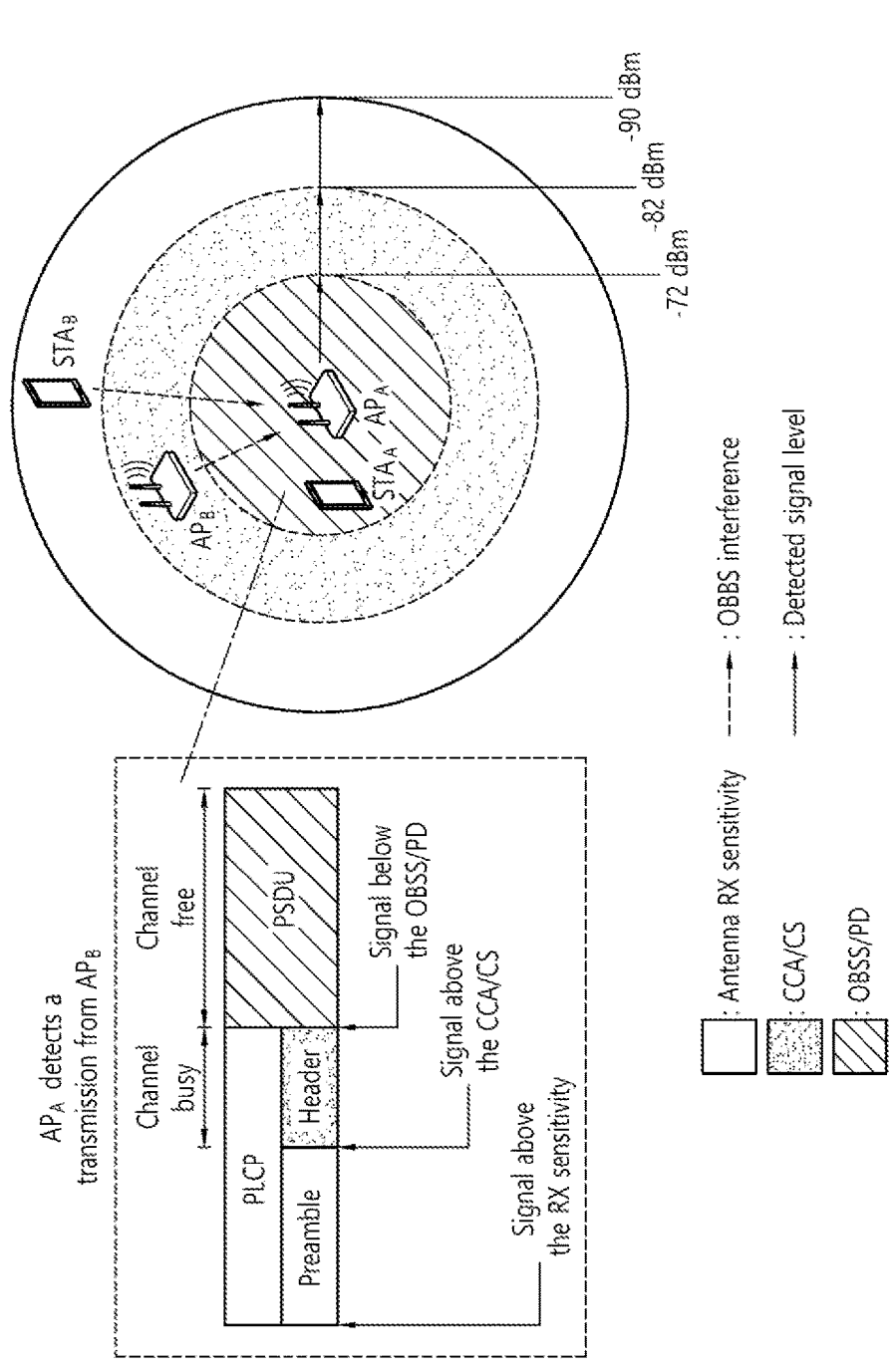
FIG. 13 is an example illustrating a CS area in a WLAN system.

FIG. 13 is an example illustrating a CS area in a WLAN system.

The aforementioned concept is illustrated in FIG. 13. In FIG. 13, the $AP_A$ in the middle can detect a received signal higher than the receiver sensitivity of the antenna, but can only decode signals above the CCA/CS threshold. In addition, channel utilization is improved because $AP_B$ transmission can be ignored using the OBSS/PD threshold due to the 11ax SR operation. In addition, transmit power limiting is applied in the case of a TXOP sensed using the OBSS/PD threshold. In FIG. 13, transmit power is fixed and all devices use the same frequency channel.

1.1 OBSS PD-based SR

Upon receiving a PPDU, the MAC layer of a specific device receives notification from the PHY. At this time, the node inspects the frame and determines whether the PPDU is an Intra-BSS frame or an Inter-BSS frame among various operations. By quickly identifying the source of an ongoing transmission, a HE STA can improve the probability of accessing a channel using an appropriate OBSS/PD value.

802.11ax defines a set of rules to limit the OBSS/PD threshold, and the upper limit is as follows.

$$OBSS/PD \le \max(OBSS/PD_{min}, \min(OBSS/PD_{max}, OBSS/PD_{min} + (TX\_PWR_{ref} - TX\_PWR))),$$

Here, $OBSS/PD_{min}$ and $OBSS/PD_{max}$ are −82 dBm and −62 dBm, respectively, and the reference power TX $PWR_{ref}$ is 21 dBm or 25 dBm depending on the capability of the device. TX PWR means the transmit power at the antenna connector in dBm of the HE node that identifies the SR-based TXOP.

Figure 14:
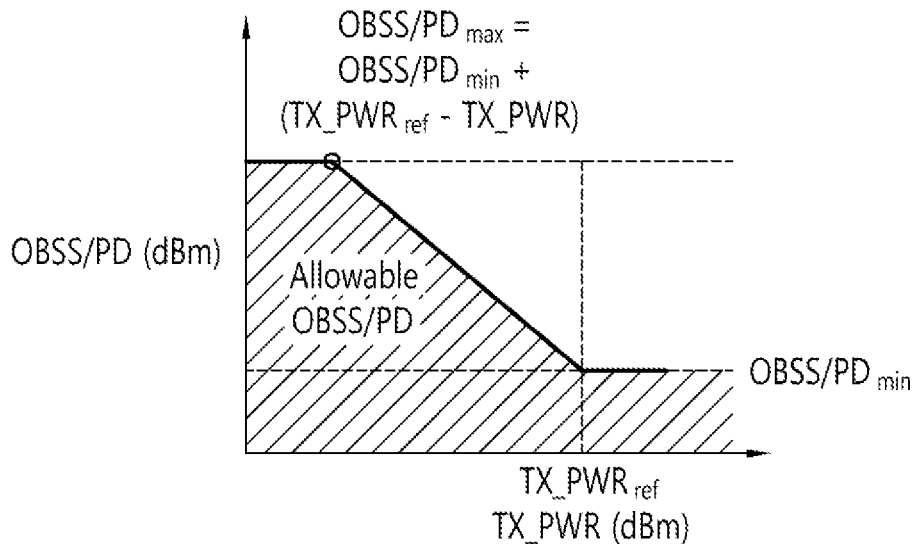
FIG. 14 is a graph showing adjustment rules for OBSS/PD and transmit power.

FIG. 14 is a graph showing adjustment rules for OBSS/PD and transmit power.

Along with sensitivity adjustment, SR operations include transmit power limiting for all transmissions that occur as a result of a sensed SR TXOP (i.e., after ignoring inter-BSS frames given via OBSS/PD-based SR operations). The maximum allowable transmit power (TX $PWR_{max}$) is defined as:

$$TX\_PWR_{max} = TX\_PWR_{ref} - (OBSS/PD - OBSS/PD_{min})$$

The previous equation holds for $OBSS/PD_{max} \ge OBSS/PD > OBSS/PD_{min}$. Otherwise, the maximum transmit power is not limited. By applying power limiting, the OBSS/PD value aims to reduce the effect of simultaneous transmission caused by SR.

Simply put, the higher the OBSS/PD threshold (more inter-BSS transmissions can be ignored), the lower the transmit power (less interference must be generated). The transmit power limit lasts until the end of the SR TXOP identified by the HE node, which begins when the backoff reaches zero. This period depends on the active transmission period used to detect the SR TXOP.

1.2 Parametrized Spatial Reuse (PSR)

PSR operation is defined as an alternative to OBSS/PD based SR for TB transmission.

A node using a PSR opportunity identifies the PSR opportunity in the sensed TB transmission. On the other hand, the opportunist performs TB transmission and finds a transmission holder indicating support for PSR operation in the header of TF (Trigger Frame). To identify a PSR opportunity, the opportunist must check whether the TB PPDU following a given TF packet can be ignored.

To do so, the opportunist's intended transmit power must not exceed the requirement imposed by the transmit holder (encapsulated in the PSR_INPUT parameter).

If the opportunist checks the PSR value of the detected TF and confirms that the intended transmit power is acceptable, it is transmitted during the duration of the TB PPDU(s) (indicated in the Common Info field). In particular, the intended transmit power must be less than the PSR value measured in the legacy portion of the TF (i.e., the PHY header) minus the Received Power Level (RPL). The PSR value is calculated as follows.

$$PSR = TX\ PWR_{AP} + I_{AP}^{max}$$

where TX PWRAP is the normalized transmit power in dBm at the output of the antenna connector and I^max_AP is the normalized value in dB that captures the maximum allowed interference at the transmit holder. In particular, Î'max_AP is calculated by subtracting the minimum SNR that gives 10% PER from the target RSSI indicated in TF (based on the highest MCS used for UL HE TB PPDU transmission). A safety margin (set in the AP) is also included to not exceed 5 dB.

2. Trigger Frame and SR

Figure 15:
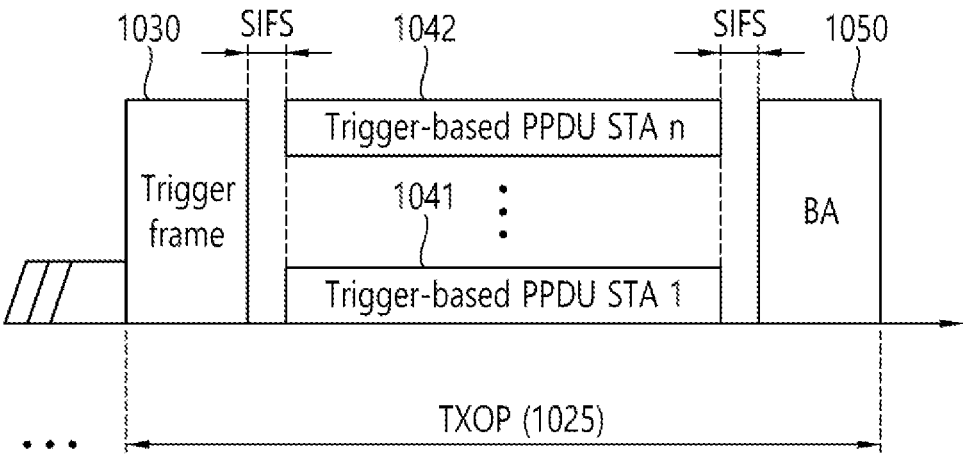
FIG. 15 shows an operation according to UL-MU.

FIG. 15 shows an operation according to UL-MU.

As shown, a transmitting STA (e.g., AP) may perform channel access through contending (i.e., backoff operation) and transmit a trigger frame 1030. That is, the transmitting STA (e.g., AP) may transmit a PPDU including a trigger frame 1030. When a PPDU including a trigger frame is received, a TB (trigger-based) PPDU is transmitted after a delay equal to SIFS.

The TB PPDUs 1041 and 1042 may be transmitted in the same time zone and transmitted from a plurality of STAs (e.g., user STAs) for which AIDs are indicated in the trigger frame 1030. The ACK frame 1050 for the TB PPDU may be implemented in various forms.

Specific characteristics of the trigger frame are described with reference to FIGS. 16 to 19. Even when UL-MU communication is used, an orthogonal frequency division multiple access (OFDMA) technique or a MU MIMO technique may be used, and OFDMA and MU MIMO techniques may be used simultaneously.

FIG. 16 shows an example of a common information field of a trigger frame.

FIG. 17 shows another example of a common information field of a trigger frame.

FIG. 16 shows an HE variant of a common information field, and FIG. 17 shows an EHT variant of a common information field. That is, the trigger frame may include a common information field corresponding to the HE variant and/or a common information field corresponding to the EHT variant.

Figure 18:
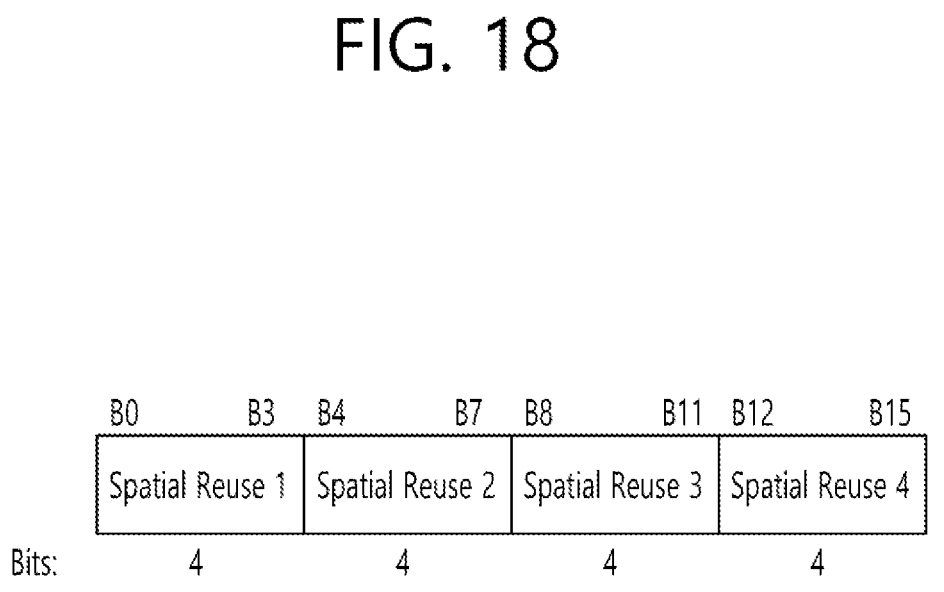

FIG. 18 shows a format of a UL Spatial Reuse subfield.

Referring to FIGS. 16 and 17, when the trigger frame requests the HE TB PPDU, the UL Spatial Reuse subfield of the common information field delivers a value to be included in the Spatial Reuse field in the HE-SIG-A field of the requested HE TB PPDU. In the UL Spatial Reuse subfield, each Spatial Reuse n subfield (1<=n<=4) is set to the same value as the corresponding subfield in the HE-SIG-A field of the HE TB PPDU. Spatial Reuse 1, Spatial Reuse 2, Spatial Reuse 3, and Spatial Reuse 4 fields included in the HE-SIG-A field of the HE TB PPDU are defined as follows. Each Spatial Reuse field consists of 4 bits.

Each Spatial Reuse field included in the HE-SIG-A field of the HE TB PPDU indicates whether a specific spatial reuse mode is allowed in a subband of the PPDU while the PPDU is being transmitted, and indicates a value used to determine the limit on transmission power of a Parameterized Spatial Reuse Transmission (PSRT) PPDU when PSR reuse is allowed.

First, if the Bandwidth field indicates 20 MHz, 40 MHz or 80 MHz, the Spatial Reuse 1 field is applied to the first 20 MHz subband. If the bandwidth field indicates 160/80+80 MHz, the Spatial Reuse 1 field is applied to the first 40 MHz subband of the 160 MHz operating band. The Spatial Reuse 1 field is set to one of the Spatial Reuse field encoding values for the HE TB PPDU as shown in Table 3 below. The Spatial Reuse 1 field refers to the first value in the TXVECTOR parameter SPATIAL_REUSE when present.

Second, if the bandwidth field indicates 40 MHz or 80 MHz, the Spatial Reuse 2 field is applied to the second 20

MHz subband. If the channel width in which the STA operates is 20 MHz, the Spatial Reuse 2 field is set to the same value as the Spatial Reuse 1 field. If the channel width in which the STA operates is 40 MHz in the 2.4 GHz band, the Spatial Reuse 2 field is set to the same value as the Spatial Reuse 1 field. If the bandwidth field indicates 160/80+80 MHz, the Spatial Reuse 2 field is applied to the second 40 MHz subband of the 160 MHz operating band. The Spatial Reuse 2 field is set to one of the Spatial Reuse field encoding values for the HE TB PPDU as shown in Table 3 below. The Spatial Reuse 2 field refers to the second value in the TXVECTOR parameter SPATIAL_REUSE when present.

Thirdly, if the bandwidth field indicates 80 MHz, the Spatial Reuse 3 field is applied to the third 20 MHz subband. If the channel width in which the STA operates is 20 MHz or 40 MHz, the Spatial Reuse 3 field is set to the same value as the Spatial Reuse 1 field. If the bandwidth field indicates 160/80+80 MHz, the Spatial Reuse 3 field is applied to the third 40 MHz subband of the 160 MHz operating band. If the channel width in which the STA operates is 80+80 MHz, the Spatial Reuse 3 field is set to the same value as the Spatial Reuse 1 field. The Spatial Reuse 3 field is set to one of the Spatial Reuse field encoding values for the HE TB PPDU as shown in Table 3 below. The Spatial Reuse 3 field refers to the third value in the TXVECTOR parameter SPATIAL_REUSE when present.

Fourth, if the bandwidth field indicates 80 MHz, the Spatial Reuse 4 field is applied to the fourth 20 MHz subband. If the channel width in which the STA operates is 20 MHz, the Spatial Reuse 4 field is set to the same value as the Spatial Reuse 1 field. If the channel width in which the STA operates is 40 MHz, the Spatial Reuse 4 field is set to the same value as the Spatial Reuse 2 field. If the bandwidth field indicates 160/80+80 MHz, the Spatial Reuse 4 field is applied to the fourth 40 MHz subband of the 160 MHz operating band. If the channel width in which the STA operates is 80+80 MHz, the Spatial Reuse 4 field is set to the same value as the Spatial Reuse 2 field. The Spatial Reuse 4 field is set to one of the Spatial Reuse field encoding values for the HE TB PPDU as shown in Table 3 below. The Spatial Reuse 4 field refers to the fourth value in the TXVECTOR parameter SPATIAL_REUSE when present.

TABLE 3

| Value | Meaning |
|---|---|
| 0 | PSR_DISALLOW |
| 1 | PSR = −80 dBm |
| 2 | PSR = −74 dBm |
| 3 | PSR = −68 dBm |
| 4 | PSR = −62 dBm |
| 5 | PSR = −56 dBm |
| 6 | PSR = −50 dBm |
| 7 | PSR = −47 dBm |
| 8 | PSR = −44 dBm |
| 9 | PSR = −41 dBm |
| 10 | PSR = −38 dBm |
| 11 | PSR = −35 dBm |
| 12 | PSR = −32 dBm |
| 13 | PSR = −29 dBm |
| 14 | PSR ≥ −26 dBm |
| 15 | PSR_AND_NON_SRG_OBSS_PD_PROHIBITED |

The four Spatial Reuse 1, 2, 3, and 4 fields are arranged in order of frequency as follows.

In the case of 20 MHz, one Spatial Reuse field corresponds to the entire 20 MHz (the other 3 Spatial Reuse fields show the same value). The Spatial Reuse field applies only to the 20 MHz used for transmission.

In the case of 40 MHz, there are two Spatial Reuse fields including a Spatial Reuse 3 field having the same value as the Spatial Reuse 1 field and a Spatial Reuse 4 field having the same value as the Spatial Reuse 2 field. Each pair of Spatial Reuse fields applies only to the corresponding 20 MHz used for transmission.

In the case of 80 MHz, there are four Spatial Reuse fields, one for each 20 MHz subchannel.

In the case of OFDMA transmission of a given BW, each Spatial Reuse field corresponding to a 20 MHz subband is also applicable to the 242-tone RUs aligned closest to the frequency of the 20 MHz subband described above (in the tone plan for that BW). The correspondence from Spatial Reuse field to 242-tone RU is also applied to all RUs within 242 ton RU. The above also shows that it implies that the 20 MHz OBSS STA uses the Spatial Reuse field corresponding to its own 20 MHz channel, the 40 MHz OBSS STA located in the lower frequency half of the 80 MHz BSS uses the values of the Spatial Reuse 1 field and Spatial Reuse 2 field, and the 40 MHz OBSS STA located at the upper frequency half of the 80 MHz BSS uses Spatial Reuse 3 field and Spatial Reuse 4 field values.

For 160 MHz and 80+80 MHz, there are four Spatial Reuse fields, one for each 40 MHz subchannel.

In the case of OFDMA transmission of a given BW, each Spatial Reuse field corresponding to a 40 MHz subband can also be applied to the 484-tone RU aligned closest to the frequency of the aforementioned 40 MHz subband. The correspondence from Spatial Reuse field to 484-tone RU is also applied to all RUs within 484-tone RU.

The table below shows an example of encoding a Spatial Reuse field for HE SU PPDU, HE ER SU PPDU, and HE MU PPDU.

TABLE 4

| Value | Meaning |
|-------|---------|
| 0 | PSR_DISALLOW |
| 1-12 | Reserved |
| 13 | SR_RESTRICTED |
| 14 | SR_DELAYED |
| 15 | PSR_AND_NON_SRG_OBSS_PD_PROHIBITED |

Returning to FIG. 18 again, when the trigger frame requests the EHT TB PPDU, each Spatial Reuse n subfield (1<=n<=4) of the Common Info field is a Spatial Reuse 1 subfield or Spatial Reuse 2 subfield of the Special User Info field. determined based on one of the fields.

FIG. 19 shows an example of a Special User Info field format.

If the Special User Info field is included in the trigger frame, the Special User Info Field Present subfield of the EHT variant of the Common Info Field is set to 0, otherwise it is set to 1.

The Special User Info field is identified by an AID12 value of 2007 and is optionally present in a trigger frame generated by the EHT AP.

The Special User Info field, if present, is located immediately after the Common Info field of the trigger frame, conveys the nonderived subfield of the U-SIG field of the requested EHT TB PPDU, and the Special User Info Field of the Common Info field Present Subfield is set to 0.

The existence of the Special User Info field in the trigger frame is indicated by B55 of the Common Info field in the trigger frame. B55 is set to 1 to indicate that there is no Special User Info field in the trigger frame, and is set to 0 to indicate that the Special User Info field exists in the trigger frame right after the Common Info field.

The Spatial Reuse n subfield (1<=n<=2) of FIG. 19 is set to the same value as the corresponding Spatial Reuse subfield in the U-SIG field of the EHT TB PPDU. Spatial Reuse 1 and Spatial Reuse 2 fields included in the U-SIG field of the EHT TB PPDU are defined as follows. Each Spatial Reuse field consists of 4 bits.

Each Spatial Reuse field included in the U-SIG field of the EHT TB PPDU indicates whether a specific spatial reuse mode is allowed in a subband of the PPDU while the PPDU is being transmitted, and indicates a value used to determine the transmission power limit of the PSRT PPDU when PSR reuse is allowed.

First, if the bandwidth field indicates 20 MHz or 40 MHz, the Spatial Reuse 1 field is applied to the first 20 MHz subband. If the bandwidth field indicates 80 MHz, the Spatial Reuse 1 field is applied to each 20 MHz subchannel of the first 40 MHz subband within the 80 MHz operating band. If the bandwidth field indicates 160 MHz, the Spatial Reuse 1 field is applied to each 20 MHz subchannel of the first 80 MHz subband within the 160 MHz operating band. If the bandwidth field indicates 320 MHz-1 or 320 MHz-2, the Spatial Reuse 1 field is applied to each 20 MHz subchannel of the first 160 MHz subband within the 320 MHz operating band.

The Spatial Reuse 1 field is set to the SPATIAL_REUSE (1) parameter of TXVECTOR including the Spatial Reuse field encoding value for the HE TB PPDU as shown in Table 3 above.

Second, if the bandwidth field indicates 20 MHz, the Spatial Reuse 2 field is set to the same value as the Spatial Reuse 1 field, and disregarded if dot11EHTBaseLineFeaturesImplementedOnly is true. If the bandwidth field indicates 40 MHz, the Spatial Reuse 2 field is applied to the second 20 MHz subband. When operating in the 2.4 GHz band, the Spatial Reuse 2 field is set to the same value as the Spatial Reuse 1 field. If the bandwidth field indicates 80 MHz, the Spatial Reuse 2 field is applied to each 20 MHz subchannel of the second 40 MHz subband within the 80 MHz operating band. If the bandwidth field indicates 160 MHz, the Spatial Reuse 2 field is applied to each 20 MHz subchannel of the second 80 MHz subband within the 160 MHz operating band. If the bandwidth field indicates 320 MHz-1 or 320 MHz-2, the Spatial Reuse 2 field is applied to each 20 MHz subchannel of the second 160 MHz subband within the 320 MHz operating band.

The Spatial Reuse 2 field is set to the SPATIAL_REUSE (2) parameter of TXVECTOR including the Spatial Reuse field encoding value for the HE TB PPDU as shown in Table 3 above.

3. Embodiments Applicable to this Specification

In the WLAN 802.11be system, transmission of increased streams is considered by using a wider band than the existing 802.11ax or using more antennas to increase peak throughput. In addition, the present specification also considers a method of aggregating and using various bands/links.

Meanwhile, in order to reduce interference between BSSs, spatial reuse can be used in the same way as 802.11ax, and the present specification proposes a configuration of a spatial reuse field of an EHT TB PPDU.

The EHT trigger frame reuses the structure of the HE Trigger frame for backward compatibility with 802.11ax, and instead, the EHT Common Info field and EHT User Info field for the EHT TB PPDU can be configured.

The Special User Info field is a User Info field that does not deliver user-specific information and delivers extended common information that is not provided in the Common Info field.

When the Special User Info field is included in the trigger frame, the Special User Info field flag subfield of the EHT variant of the Common Info field is set to 0, and when the Special User Info field is not included in the trigger frame, the Special User Info field flag subfield field is set to 1.

The Special User Info field is identified by an AID12 value of 2007 and is optionally present in a trigger frame generated by the EHT AP.

If the Special User Info field exists, it is located immediately after the Common Info field of the Trigger frame and transmits a nonderived subfield of the U-SIG field of the requested EHT TB PPDU, and the Special User Info Field Flag subfield of the Common Info field is set to 0.

The existence of the Special User Info field in the trigger frame is indicated by B55 of the Common Info field in the trigger frame. B55 is set to 1 to indicate that there is no Special User Info field in the Trigger frame, and is set to 0 to indicate that the Special User Info field exists in the Trigger frame immediately after the Common Info field.

Referring to FIG. 19, in the Special User Info field, the AID12 subfield consists of 12 bits, the PHY Version ID subfield consists of 3 bits, the UL Bandwidth Extension subfield consists of 2 bits, Spatial Reuse 1 subfield consists of 4 bits, he Spatial Reuse 2 subfield consists of 4 bits, the U-SIG Disregard And Validate subfield consists of 12 bits, and the Reserved subfield consists of 3 bits.

The PHY Version ID subfield indicates the Wi-Fi version after EHT and EHT. For EHT, the PHY Version ID subfield is set to 0. The UL Bandwidth Extension subfield indicates the bandwidth of the TB PPDU requested from the EHT STA addressed together with the UL BW subfield of the Common Info field (i.e., the bandwidth of the U SIG field of the EHT TB PPDU). The UL bandwidth extension subfields are defined in the table below.

TABLE 5

| UL BW | Bandwidth for HE TB PPDU (MHz) | UL Bandwidth Extension | Bandwidth for EHT TB PPDU (MHz) |
|---|---|---|---|
| 0 | 20 | 0 | 20 |
| 0 | 20 | 1 | Reserved |
| 0 | 20 | 2 | Reserved |
| 0 | 20 | 3 | Reserved |
| 1 | 40 | 0 | 40 |
| 1 | 40 | 1 | Reserved |
| 1 | 40 | 2 | Reserved |
| 1 | 40 | 3 | Reserved |
| 2 | 80 | 0 | 80 |
| 2 | 80 | 1 | Reserved |
| 2 | 80 | 2 | Reserved |
| 2 | 80 | 3 | Reserved |
| 3 | 160 | 0 | Reserved |
| 3 | 160 | 1 | 160 |
| 3 | 160 | 2 | 320-1 |
| 3 | 160 | 3 | 320-2 |

The following shows an example of the configuration of the UL BW and UL BW Extension fields when an Aggregated-PPDU (A-PPDU) in which HE Sub-PPDU and EHT Sub-PPDU are mixed is triggered.

TABLE 6

| UL BW | Bandwidth for HE TB PPDU (MHz) | UL Bandwidth Extension | Bandwidth for EHT TB PPDU (MHz) |
|---|---|---|---|
| 0 | 20 | 0 | 20 |
| 0 | 20 | 1 | Reserved |
| 0 | 20 | 2 | Reserved |
| 0 | 20 | 3 | Reserved |
| 1 | 40 | 0 | 40 |
| 1 | 40 | 1 | Reserved |
| 1 | 40 | 2 | Reserved |
| 1 | 40 | 3 | Reserved |
| 2 | 80 | 0 | 80 |
| 2 | 80 | 1 | 160 |
| 2 | 80 | 2 | 320-1 |
| 2 | 80 | 3 | 320-2 |
| 3 | 80 | 0 | 80 |
| 3 | 160 | 1 | 160 |
| 3 | 160 | 2 | 320-1 |
| 3 | 160 | 3 | 320-2 |

The UL BW and UL BW Extension fields may be configured in a manner different from the above table.

Spatial Reuse 1 and 2 subfields are set to the same values as Spatial Reuse 1 and 2 subfields of the U-SIG field of the EHT TB PPDU, which are values for specific channels according to BW and will be described in more detail below.

The U-SIG Disregard And Validate subfield is set to a value copied as it is in the Reserved field in the U-SIG of the EHT TB PPDU. Reserved subfield 3 bits can be reserved or used for other purposes.

FIG. 20 shows an example of an EHT User Info field format.

Referring to FIG. 20, a PS160 field indicates an RU and a multi-resource unit (MRU) allocated to an STA along with a RU Allocation field.

FIG. 10 shows the structure of a representative EHT PPDU. It can be used for SU and MU transmission, and EHT-SIG may not be included when TB PPDU is transmitted.

Universal-SIG (U-SIG) includes a version independent field and a version dependent field.

EHT-SIG can carry various common information and user specific information.

The bandwidth can be indicated using the bandwidth field, which can be included in U-SIG version independent. The corresponding field may consist of 3 bits and may contain only bandwidth information without including information on the preamble puncturing pattern. In addition, puncturing information may be carried in other fields of U-SIG or specific fields of EHT-SIG.

In addition, the version independent field may include a 3-bit version identifier indicating a Wi-Fi version after 802.11be and 802.11be, a 1-bit DL/UL field, BSS color, TXOP duration, etc., and the version dependent field may include information such as PPDU type. In addition, U-SIG is jointly encoded with two symbols and consists of 52 data tones and 4 pilot tones for each 20 MHz. Also, it is modulated in the same way as HE-SIG-A. That is, it is modulated at BPSK 1/2 code rate. Also, EHT-SIG can be encoded as a variable MCS, and as in the existing 802.11ax, 1 2 1 2 . . . in units of 20 MHz. It may have a structure (may be composed of other structures, for example, 1 2 3 4 . . . or 1 2 1 2 3 4 3 4 . . . ), may also be configured in units of 80 MHz, and in a bandwidth of 80 MHz or higher, the EHT-SIG may be duplicated in units of 80 MHz.

Spatial Reuse can be used to reduce interference with OBSS. This specification particularly proposes a configuration of a spatial reuse field in the EHT TB PPDU. In the EHT TB PPDU, the spatial reuse field may be located in a U-SIG version dependent field and may be composed of 4 fields as in 802.11ax, and each field may use 4 bits. The meaning of each entry expressed by each 4 bits may be the same as that described above or may have a different meaning. Alternatively, each field may use a different number of bits. Also, in the EHT TB PPDU, the spatial reuse field may consist of 2 fields instead of 4 fields.

The following is a configuration of a representative U-SIG field of the EHT TB PPDU.

TABLE 7

| Two parts of U-SIG | Bit | Field | Number of bits | Description |
|---|---|---|---|---|
| U-SIG1 | BO-B2 | PHY Version Identifier | 3 | Differentiate between different PHY clauses. Set to 0 for EHT. Values 1-7 are Validate if dot11EHTBaseLineFeatures ImplementedOnly equals true. |
| | B3-85 | BW | 3 | Set to 0 for 20 MHz. Set to 1 for 40 MHZ, Set to 2 for 80 MHz. Set to 3 for 160 MHz. Set to 4 for 320 MHz-1. Set to 5 for 320 MHz-2 |
| | B6 | UL/DL | 1 | Set to 1 to indicate that the PPDU is addressed to the AP. |
| | B7-B12 | BSS Color | 6 | An identifier of the BSS. See the TXVECTOR parameter BSS_COLOR. |
| | B13-B19 | TXOP | 7 | Set to 127 to indicate no duration information if the TXVECTOR parameter TXOP_DURATION is UNSPECIFIED. Set to a value less than 127 to indicate duration information for NAV setting and protection of the TXOP as follows: If the TXVECTOR parameter TXOP_DURATION is less than 512, then B13 is set to 0 and B14-B19 is set to floor(TXOP_DURATION/8). Otherwise, B13 is set to 1 and B14-B19 is set to floor((TXOP_DURATION512)/128), |
| | B20-B25 | Disregard | 6 | Set to a value indicated in B25-B30 of the U-SIG Disregard and Validate subfield in the Special User Info field in the Trigger frame and Disregard if dot11EHTBaseLineFeatures ImplementedOnly equals to true. See Table 9- 29j4 (Mapping from Special User Info field to U-SIG-1 and U-SIG-2 fields in the EHT TB PPDU) |
| U-SIG2 | B0-B1 | PPDU Type And Compressed Mode | 2 | Set to a value of 0 for a TB PPDU. For further clarification on all values of this field. refer to Combination of UL/DL and PPDU Type And Compression Mode field. Undefined values of this field are Validate if dot11EHTBaseLineFeatures ImplementedOnly equals true. |
| | B2 | Validate | 1 | Set to a value indicated in B31 of the U-SIG Disregard and Validate subfield in the Special User Info field in the Trigger frame and Validate if dot11EHTBaseLineFeatures ImplementedOnly equals true. |
| | B3-B6 | Spatial Reuse 1 | 4 | Indicates whether or not specific spatial reuse modes are allowed in a subband of the PPDU during the transmission of this PPDU, and if PSR spatial reuse is allowed, indicates a value that is used to determine a limit on the transmit power of the PSRT PPDU. If the Bandwidth field indicates 20 MHz or 40 MHz, then this field applies to the first 20 MHz subband. If the Bandwidth field indicates 80 MHz, then this field applies to each 20 |

TABLE 7-continued

| Two parts of U-SIG | Bit | Field | Number of bits | Description |
|---|---|---|---|---|
| | | | | MHz subchannel of the first 40 MHz subband within the 80 MHz operating band. If the Bandwidth field indicates 160 MHz, then this field applies to each 20 MHz subchannel of the first 80 MHz subband within the 160 MHz operating band. If the Bandwidth field indicates 320 MHz-1 or 320 MHz-2, then this field applies to each 20 MHz subchannel of the first 160 MHz subband within the 320 MHz operating band. |
| | B7-B10 | Spatial Reuse 2 | 4 | Indicates whether or not specific spatial reuse modes are allowed in a subband of the PPDU during the transmission of this PPDU, and if PSR spatial reuse is allowed, indicates a value that is used to determine a limit on the transmit power of the PSRT PPDU. If the Bandwidth field indicates 20 MHz, this field is set to the same value as the Spatial Reuse 1 field, and Disregard if dot11EHTBaseLineFeatures ImplementedOnly equals true. If the Bandwidth field indicates 40 MHZ, this field applies to the second 20 MHz subband. If operating in the 2.4 GHz band, this field is set to the same value as the Spatial Reuse 1 field. If the Bandwidth field indicates 80 MHz, then this field applies to each 20 MHz subchannel of the second 40 MHz subband within the 80 MHz operating band. If the Bandwidth field indicates 160 MHz, then this field applies to each 20 MHz subchannel of the second 80 MHz subband within the 160 MHz operating band. If the Bandwidth field indicates 320 MHz-1 or 320 MHz-2, then this field applies to each 20 MHz subchannel of the second 160 MHz subband within the 320 MHz operating band. |
| | B11-B15 | Disregard | 5 | Set to a value indicated in B32-B36 of the U-SIG Disregard and Validate subfield in the Special User Info field in the Trigger frame and Disregard if dot11EHTBaseLineFeatures ImplementedOnly equals true. |
| | B16-B19 | CRC | 4 | CRC for bits 0-41 of the USIG field. Bits 0-41 of the U-SIG field correspond to bits 0-25 of USIG-1 field followed by bits 0-15 of U-SIG-2 field |
| | B20-B25 | Tail | 6 | Used to terminate the trellis of the convolutional decoder. Set to 0. |
| | | Total # of Bits in U-SIG | 52 | |

The above U-SIG field can be configured by copying the field of the trigger frame as it is.

The structure of the EHT Trigger frame, HE TB PPDU, and EHT TB PPDU is as follows.

The EHT Trigger frame consists of a HE/EHT variant Common Info field, (Special User Info field) and a HE/EHT variant User Info field. The EHT variant Common Info field includes 4 Spatial Reuse fields, and the 4 Spatial Reuse fields are applied to each of 4 subchannels and are defined for SR (Spatial Reuse) of the OBSS HE STA.

The Special User Info field exists when AID=2007, includes two Spatial Reuse fields, the two Spatial Reuse fields are duplicated to the two Spatial Reuse fields in the U-SIG of the EHT TB PPDU and are defined for the SR of the OBSS EHT STA.

As described above, the bandwidth of the EHT TB PPDU is indicated through the 2-bit UL BW field in the EHT variant Common Info field and the 2-bit UL Bandwidth Extension subfield in the Special User Info field.

Among the UL HE-SIG-A2 Reserved subfields in the HE variant Common Info field, B54 and B55 are used as HE/EHT P160 and Special User Info Field Flag subfields in the EHT variant Common Info field, respectively (see FIGS. 16 and 17).

The HE/EHT P160 subfield indicates whether the primary 160 is a HE TB PPDU (set to 1) or an EHT TB PPDU (set to 0). The Special User Info Field Flag subfield indicates whether the Special User Info field exists (set to 0) or not (set to 1). That is, B54 and B55 of the UL HE-SIG-A2 Reserved subfields were originally set to 11, but when the EHT Trigger frame triggers the EHT TB PPDU, B54 and B55 are set to 00.

The HE TB PPDU includes 4 Spatial Reuse fields in HE-SIG-A. The EHT TB PPDU includes two Spatial Reuse fields in the U-SIG. For the two Spatial Reuse fields included in the U-SIG, the values of the two Spatial Reuse fields of the Special User Info field are duplicated. 802.11be supports Non-HT Dup PPDU as in the existing 802.11ax, which consists of L-STF/L-LTF/L-SIG/Data field, and All fields are duplicated every 20 MHz within BW (except for the puncturing part). In this specification, it is assumed that a trigger frame is transmitted using such a Non-HT Dup PPDU.

In this specification, considering the case where the Trigger frame triggers the EHT TB PPDU, a method of configuring 4 Spatial Reuse fields of the Common Info field and 2 Spatial Reuse fields of the Special Info field is proposed. In particular, this specification proposes a method of configuring a trigger frame using a partial non-HT duplication PPDU. Partial Non-HT Dup PPDU assumes that two or more Non-HT Dup PPDUs of 160 MHz or less are used. That is, it is assumed that two or more trigger frames using a BW of 160 MHz or less are transmitted. For example, it is assumed that when a trigger frame triggers a 320 MHz EHT TB PPDU, the trigger frame is duplicated and transmitted in units of 20 MHz only within 160 MHz.

3.1. Configuration of 2 Spatial Reuse Fields (ESR1, ESR2) of EHT Common Info Field (or Special User Info Field)

Two Spatial Reuse fields of the EHT Common Info field in each Trigger Frame composed of Non-HT Dup PPDUs can be set as follows according to the BW of the EHT TB PPDU (indicated through UL BW and UL Bandwidth Extension fields). It can be set identically within all Trigger Frames.

i) 20 MHz:
The two spatial reuse fields may have the same spatial reuse value and may mean a spatial reuse value corresponding to a 20 MHz channel.

ii) 40 MHz:
Spatial reuse field 1: This may generally mean a spatial reuse value of the lowest 20 MHz subchannel.
Spatial reuse field 2: This may generally mean a spatial reuse value of the highest 20 MHz subchannel. In addition, even when the TB PPDU is transmitted in the 2.4 GHz band, spatial reuse field 2 may be set to the same value as spatial reuse field 1. The reason is that since 40 MHz channelization overlaps in the 2.4 GHz band, it is impossible to determine which channelization was used by the OBSS STA that decoded the corresponding TB PPDU in a specific 20 MHz channel, so it is simply set to the same value.

iii) 80 MHz:
Spatial reuse field 1: This may generally mean a spatial reuse value of the lowest 40 MHz subchannel.
Spatial reuse field 2: This may generally mean a spatial reuse value of the highest 40 MHz subchannel.

iv) 160 MHz:
Spatial reuse field 1: This may generally mean a spatial reuse value of the lowest 80 MHz subchannel.
Spatial reuse field 2: This may generally mean a spatial reuse value of the highest 80 MHz subchannel.

v) 320 MHz:
Spatial reuse field 1: This may generally mean a spatial reuse value of the lowest 160 MHz subchannel.
Spatial reuse field 2: This may generally mean a spatial reuse value of the highest 160 MHz subchannel.

3.2. Composition of 4 Spatial Reuse Fields of Common Info Field (HSR1, HSR2, HSR3, HSR4)

The 4 Spatial Reuse fields of the Common Info field in each Trigger Frame composed of Non-HT Dup PPDU can be set as follows according to the BW (indicated by UL BW and UL Bandwidth Extension fields) and UL BW fields of the EHT TB PPDU. Unlike the two Spatial Reuse fields of the EHT Common Info field, the four Spatial Reuse fields of the Common Info field can be configured differently for each Trigger Frame.

The 4 Spatial Reuse fields in the Common Info field are in the configuration example of the UL BW and UL Bandwidth Extension fields above. When the 320 MHz EHT TB PPDU is triggered, it can be set as follows according to the BW (160 MHz) indicated in the UL BW (Even if it is not the above example, if the 320 MHz EHT TB PPDU is triggered, the BW indicated in the UL BW is 160 MHz). It is assumed that different 160 MHz Trigger Frames are transmitted for each 160 MHz. Like 160 MHz in Appendix 1 described later, 4 Spatial Reuse fields in the Common Info field of each 160 MHz Trigger Frame can be set.

Alternatively, the setting of 2 Spatial Reuse fields in the EHT Common Info field is described in 3.1, and 4 Spatial Reuse fields in the Common Info field of each 160 MHz Trigger Frame can be set using this. That is, when the 320 MHz EHT TB PPDU is triggered, the two Spatial Reuse fields in the EHT Common Info field are each set to a spatial reuse value corresponding to 160 MHz. It can be duplicated as it is and set the same as it is in the 4 Spatial Reuse fields in the Common Info field of the Trigger Frame transmitted at 160 MHz (4 values within a specific trigger frame are set identically, and set differently for each trigger frame). In addition, in order to correct the value according to the BW difference, after adding or subtracting a specific dbm value to the meaning (dBm value) of the corresponding value, it can be changed to a value corresponding to the maximum dbm value that is less than or equal to this value (4 values within a specific trigger frame are set identically, and set differently for each trigger frame). In this case, it may be desirable to compensate by subtracting 12 dB in particular.

Four Spatial Reuse fields in the Common Info field can be set as follows when a 160 MHz EHT TB PPDU is triggered with a UL BW and UL Bandwidth Extension configuration and the BW indicated in the UL BW is 80 MHz. It is assumed that different 80 MHz Trigger Frames are transmitted for each 80 MHz. Like 80 MHz in Appendix 1 described later, 4 Spatial Reuse fields in the Common Info field of each 80 MHz Trigger Frame can be set.

Alternatively, the setting of 2 Spatial Reuse fields in the EHT Common Info field is described in 3.1, and 4 Spatial Reuse fields in the Common Info field of each 80 MHz Trigger Frame can be set using this. That is, when the 160 MHz EHT TB PPDU is triggered, the two Spatial Reuse fields in the EHT Common Info field are set to spatial reuse values corresponding to each 80 MHz. It can be duplicated as it is and set the same as it is in the 4 Spatial Reuse fields in the Common Info field of the Trigger Frame transmitted at 80 MHz (4 values within a specific trigger frame are set identically, and set differently for each trigger frame). In addition, in order to correct the value according to the BW difference, after adding or subtracting a specific dbm value to the meaning (dBm value) of the corresponding value, it can be changed to a value corresponding to the maximum dbm value that is less than or equal to this value (4 values within a specific trigger frame are set identically, and set differently for each trigger frame). In this case, it may be desirable to compensate by subtracting 12 dB in particular.

Four Spatial Reuse fields in the Common Info field can be set as follows when a 320 MHz EHT TB PPDU is triggered with a configuration of UL BW and UL Bandwidth Extension field and the BW indicated in the UL BW is 80 MHz. It is assumed that different 80 MHz Trigger Frames are transmitted for each 80 MHz. Like 80 MHz in Appendix 1 described later, 4 Spatial Reuse fields in the Common Info field of each 80 MHz Trigger Frame can be set.

Alternatively, the setting of 2 Spatial Reuse fields in the EHT Common Info field is described in 3.1, and 4 Spatial Reuse fields in the Common Info field of each 80 MHz Trigger Frame can be set using this. That is, when the 320 MHz EHT TB PPDU is triggered, the two Spatial Reuse fields in the EHT Common Info field are each set to a spatial reuse value corresponding to 160 MHz. It can be duplicated as it is and set the same as it is in the 4 Spatial Reuse fields in the Common Info field of the 80 MHz Trigger Frame transmitted within the corresponding 160 MHz (The four values within a specific Trigger Frame are set identically, set identically between Trigger Frames belonging to the same 160 MHz, and set differently between Trigger Frames belonging to different 160 MHz). In addition, in order to correct the value according to the BW difference, after adding or subtracting a specific dbm value to the meaning (dBm value) of the corresponding value, it can be changed to a value corresponding to the maximum dbm value that is less than or equal to this value. (The four values within a specific Trigger Frame are set identically, set identically between Trigger Frames belonging to the same 160 MHz, and set differently between Trigger Frames belonging to different 160 MHz). In this case, it may be desirable to compensate by subtracting 18 dB in particular.

Four Spatial Reuse fields in the Common Info field can be set as follows when a 320 MHz EHT TB PPDU is triggered with a UL BW and UL Bandwidth Extension configuration and the BW indicated in the UL BW is 80 MHz. It is assumed that different 80 MHz Trigger Frames are transmitted for each 80 MHz. Like 80 MHz in Appendix 1 described later, 4 Spatial Reuse fields in the Common Info field of each 80 MHz Trigger Frame can be set.

Alternatively, the setting of 2 Spatial Reuse fields in the EHT Common Info field is described in 3.1, and 4 Spatial Reuse fields in the Common Info field of each 80 MHz Trigger Frame can be set using this. That is, when the 320 MHz EHT TB PPDU is triggered, the two Spatial Reuse fields in the EHT Common Info field are each set to a spatial reuse value corresponding to 160 MHz. It can be duplicated as it is and set the same as it is in the 4 Spatial Reuse fields in the Common Info field of the 80 MHz Trigger Frame transmitted within the corresponding 160 MHz (The four values within a specific Trigger Frame are set identically, set identically between Trigger Frames belonging to the same 160 MHz, and set differently between Trigger Frames belonging to different 160 MHz). In addition, in order to correct the value according to the BW difference, after adding or subtracting a specific dbm value to the meaning (dBm value) of the corresponding value, it can be changed to a value corresponding to the maximum dbm value that is less than or equal to this value (The four values within a specific Trigger Frame are set identically, set identically between Trigger Frames belonging to the same 160 MHz, and set differently between Trigger Frames belonging to different 160 MHz). In this case, it may be desirable to compensate by subtracting 18 dB in particular.

Four Spatial Reuse fields in the Common Info field can be set as follows when a 320 MHz EHT TB PPDU is triggered with a UL BW and UL Bandwidth Extension configuration and the BW indicated in the UL BW is 80 MHz. It is assumed that different 160 MHz Trigger Frames are transmitted for each 160 MHz. Like 80 MHz in Appendix 1 described later, 4 Spatial Reuse fields in the Common Info field of each 160 MHz Trigger Frame can be set. However, 80 MHz may be one of low 80 MHz and high 80 MHz within 160 MHz in which the trigger frame is transmitted. For example, it could simply be low 80 MHz. Alternatively, each Spatial Reuse value of low 80 MHz and high 80 MHz may be set to a Spatial Reuse value of 80 MHz having a larger or smaller value. Alternatively, it may be set to a Spatial Reuse value of 80 MHz having a smaller or larger value among the minimum or maximum value of four 20 MHz Spatial Reuse values within low 80 MHz and the minimum or maximum value of four 20 MHz Spatial Reuse values within high 80 MHz.

Alternatively, 4 Spatial Reuse fields in the Common Info field of each 160 MHz Trigger Frame may be set as follows. There are four 20 MHz Spatial Reuse values within low 80 MHz and high 80 MHz of each 160 MHz, and the Spatial Reuse value can be set to a larger or smaller value by comparing the 20 MHz Spatial Reuse value at the same location within the two 80 MHz. That is, the first Spatial Reuse field in the Common Info field can be set by comparing the lowest 20 MHz Spatial Reuse value of low 80 MHz and the lowest 20 MHz Spatial Reuse value of high 80 MHz, and the second Spatial Reuse field may be set by comparing the second low 20 MHz Spatial Reuse value of low 80 MHz and the second low 20 MHz Spatial Reuse value of high 80 MHz. The third Spatial Reuse field in the Common Info field can be set by comparing the second high 20 MHz Spatial Reuse value of low 80 MHz and the second high 20 MHz Spatial Reuse value of high 80 MHz, and the fourth Spatial Reuse field may be set by comparing the highest 20 MHz Spatial Reuse value of low 80 MHz and the highest 20 MHz Spatial Reuse value of high 80 MHz.

Alternatively, the setting of 2 Spatial Reuse fields in the EHT Common Info field is described in 3.1, and 4 Spatial Reuse fields in the Common Info field of each 160 MHz Trigger Frame can be set using this. That is, when the 320 MHz EHT TB PPDU is triggered, the two Spatial Reuse fields in the EHT Common Info field are each set to a spatial reuse value corresponding to 160 MHz. It can be duplicated as it is and set the same as it is in the 4 Spatial Reuse fields in the Common Info field of the Trigger Frame transmitted at 160 MHz (The four Spatial Reuse fields represent 80 MHz, each corresponding to 20 MHz, the 160 MHz spatial reuse value is set as it is, the 4 values in a specific trigger frame are set identically, and each trigger frame is set differently). In addition, in order to correct the value according to the BW difference, after adding or subtracting a specific dbm value to the meaning (dBm value) of the corresponding value, it can be changed to a value corresponding to the maximum dbm value that is less than or equal to this value (4 values within a specific trigger frame are set identically, and set differently for each trigger frame). In this case, it may be desirable to compensate by subtracting 18 dB in particular.

Or, regardless of the BW of the EHT TB PPDU that is simply triggered or the BW indicated in the UL BW, and regardless of the BW of each Trigger Frame, Four Spatial Reuse fields in the Common Info field of all Trigger Frames can be set to a value (0) disallowing spatial reuse or a value (15) prohibiting spatial reuse. The reason is that in order for the OBSS HE STA to perform spatial reuse, it is impossible to obtain BSS color information from the EHT TB PPDU from the viewpoint of the 802.11ax wireless LAN system.

In all of the above suggestions, when setting the Spatial Reuse field by comparing several Spatial Reuse values, it may be desirable to set it to a small value. The reason for this is that when the Spatial Reuse value is set to a large value, the neighboring OBSS transmits with high power, and it may receive interference with a power greater than the allowable interference power.

In all the suggestions above, if a specific Spatial Reuse value is copied and set to a specific Spatial Reuse value, if there is a difference in BW, a specific dbm value is added to the meaning (dBm value) of the copied value to correct the value according to the BW difference, or After subtraction, it can be set by changing it to a value corresponding to the maximum dbm value that is less than or equal to this value.

Figure 21:
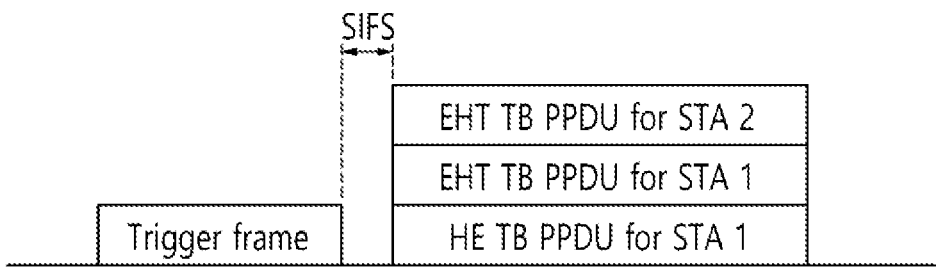
FIG. 21 shows an example of transmitting a TB A-PPDU.

FIG. 21 shows an example of transmitting a TB A-PPDU.

A TB A-PPDU (Trigger Based Aggregated-PPDU) is a PPDU in which an EHT TB PPDU and a HE TB PPDU are simultaneously transmitted by a trigger frame. As shown in FIG. 21, the trigger frame can trigger EHT TB PPDU and HE TB PPDU, and TB A-PPDU can be transmitted simultaneously by one STA by aggregating EHT TB PPDU and HE TB PPDU. Alternatively, the TB A-PPDU may be an aggregate of the EHT TB PPDU and the HE TB PPDU, and the EHT TB PPDU or HE TB PPDU may be transmitted by a plurality of STAs.

As described above, in the trigger frame triggering the TB A-PPDU, 4 spatial reuse fields for the HE TB PPDU and 2 spatial reuse fields for the EHT TB PPDU may exist. The four spatial reuse fields can be set to a value for the bandwidth of only the HE TB PPDU (i.e., considering only the bandwidth through which the HE TB PPDU is transmitted regardless of the entire bandwidth of the TB A-PPDU), the two spatial reuse fields may be set to a value considering the bandwidth of only the EHT TB PPDU or the entire bandwidth.

4 Spatial Reuse fields in the Common Info field can be set like the existing 802.11ax Trigger frame according to the BW (HE TB Sub-PPDU BW) indicated in the UL BW. This can be used to configure the Spatial Reuse field in HE-SIG-A when HE TB PPDU is transmitted. That is, as shown in Appendix 1 described later, four Spatial Reuse fields in the Common Info field can be set and a Spatial Reuse field in the HE TB Sub-PPDU can be configured.

Two Spatial Reuse fields in the EHT Common Info field can be set according to the BW (EHT TB Sub-PPDU BW or A-PPDU BW) indicated in the UL BW and UL BW Extension subfields. This can be used to configure the Spatial Reuse field in U-SIG when EHT TB PPDU is transmitted. That is, as shown in Appendix 3 described later, two Spatial Reuse fields in the EHT Common Info field can be set, and Spatial Reuse field in U-SIG of EHT TB Sub-PPDU may be configured. It may be preferable that it is set to the Spatial Reuse value of the indicated BW.

Alternatively, two Spatial Reuse fields in the EHT Common Info field are used when the BW indicated in the UL BW and UL BW Extension subfields is the EHT TB Sub-PPDU BW, it is not set according to the corresponding BW, but can be set according to the entire BW of the A-PPDU. This can be used to configure the Spatial Reuse field in U-SIG when EHT TB Sub-PPDU is transmitted. That is, as shown in Appendix 3 described later, two Spatial Reuse fields in the EHT Common Info field can be set and a Spatial Reuse field in the U-SIG of the EHT TB Sub-PPDU can be configured. This may be desirable because it is a spatial reuse value considering the BW of all A-PPDUs actually transmitted, but problems may occur depending on the value of the BW indicator of the TB PPDU.

Alternatively, two Spatial Reuse fields in the EHT Common Info field are used when the BW indicated in the UL BW and UL BW Extension subfields is A-PPDU BW, it is not set according to the corresponding BW, but can be set according to the EHT TB Sub-PPDU BW. This can be used to configure the Spatial Reuse field in U-SIG when EHT TB Sub-PPDU is transmitted. That is, as shown in Appendix 3 described later, two Spatial Reuse fields in the EHT Common Info field can be set and a Spatial Reuse field in the U-SIG of the EHT TB Sub-PPDU can be configured. This is a Spatial Reuse value that considers only the BW of the EHT TB Sub-PPDU. It has a small resolution and can be good for performance. However, problems may occur depending on the BW indicator value of the TB PPDU.

APPENDIX 1

4 Spatial Reuse fields in Common Info field of Trigger frame
i) 20 MHz:
The four spatial reuse fields may have the same spatial reuse value and may mean a spatial reuse value corresponding to a 20 MHz channel.
ii) 40 MHz:
Spatial reuse field 1: This may generally mean a spatial reuse value of the lowest 20 MHz subchannel.
Spatial reuse field 2: This may generally mean a spatial reuse value of a second lower 20 MHz subchannel. Also, when transmitting a 2.4 GHz band TB PPDU, it may be set to the same value as Spatial reuse field 1. The reason is that since 40 MHz channelization overlaps in the 2.4 GHz band, it is impossible to determine which channelization was used by the OBSS STA that decoded the corresponding TB PPDU in a specific 20 MHz channel, so it is simply set to the same value.

Spatial reuse field 3 can be set equal to 1 and spatial reuse field 4 equal to 2.

iii) 80 MHz:

Spatial reuse field 1: This may generally mean a spatial reuse value of the lowest 20 MHz subchannel. Spatial reuse field 2: This may generally mean a spatial reuse value of a second lower 20 MHz subchannel.

Spatial reuse field 3: In general, this may mean a spatial reuse value of a second higher 20 MHz subchannel.

Spatial reuse field 4: This may generally mean a spatial reuse value of the highest 20 MHz subchannel.

iv) 160 MHz:

Spatial reuse field 1: In general, this may mean a spatial reuse value of the lowest 40 MHz subchannel.

Spatial reuse field 2: In general, this may mean a spatial reuse value of a second lower 40 MHz subchannel.

Spatial reuse field 3: This may generally mean a spatial reuse value of a second higher 40 MHz subchannel.

Spatial reuse field 4: This may generally mean a spatial reuse value of the highest 40 MHz subchannel.

4 Spatial Reuse fields in HE-SIG-A of HE TB (Sub-) PPDU

Duplicate the 4 Spatial Reuse fields in the Trigger frame above as they are.

APPENDIX 2

4 Spatial Reuse fields in Common Info field of Trigger frame i) 20 MHz:

The four spatial reuse subfields may have the same spatial reuse value and may mean a spatial reuse value corresponding to a 20 MHz channel. Alternatively, spatial reuse 3 and 4 may be reserved.

ii) 40 MHz:

Spatial reuse field 1: This may generally mean a spatial reuse value of the lowest 20 MHz subchannel.

Spatial reuse field 2: This may generally mean a spatial reuse value of a second lower 20 MHz subchannel. Also, when transmitting a 2.4 GHz band TB PPDU, it may be set to the same value as Spatial reuse field 1. The reason is that since 40 MHz channelization overlaps in the 2.4 GHz band, it is impossible to determine which channelization was used by the OBSS STA that decoded the corresponding TB PPDU in a specific 20 MHz channel, so it is simply set to the same value.

Spatial reuse field 3 can be set equal to 1 and spatial reuse field 4 equal to 2. Alternatively, spatial reuse 3 and 4 may be reserved.

iii) 80 MHz:

Spatial reuse field 1: In general, this may mean a spatial reuse value of the lowest 40 MHz subchannel.

Spatial reuse field 2: This may generally mean a spatial reuse value of the highest 40 MHz subchannel.

Spatial reuse field 3 can be set equal to 1 and spatial reuse field 4 equal to 2. Alternatively, spatial reuse 3 and 4 may be reserved.

or

Spatial reuse field 1: This may generally mean a spatial reuse value of the lowest 20 MHz subchannel.

Spatial reuse field 2: This may generally mean a spatial reuse value of a second lower 20 MHz subchannel.

Spatial reuse field 3: In general, this may mean a spatial reuse value of a second higher 20 MHz subchannel.

Spatial reuse field 4: This may generally mean a spatial reuse value of the highest 20 MHz subchannel.

iv) 160 MHz:

Spatial reuse field 1: This may generally mean a spatial reuse value of the lowest 80 MHz subchannel.

Spatial reuse field 2: This may generally mean a spatial reuse value of the highest 80 MHz subchannel.

Spatial reuse field 3 can be set equal to 1 and spatial reuse field 4 equal to 2. Alternatively, spatial reuse 3 and 4 may be reserved.

or

Spatial reuse field 1: In general, this may mean a spatial reuse value of the lowest 40 MHz subchannel.

Spatial reuse field 2: In general, this may mean a spatial reuse value of a second lower 40 MHz subchannel.

Spatial reuse field 3: This may generally mean a spatial reuse value of a second higher 40 MHz subchannel.

Spatial reuse field 4: This may generally mean a spatial reuse value of the highest 40 MHz subchannel.

v) 320 MHz:

Spatial reuse field 1: This may generally mean a spatial reuse value of the lowest 160 MHz subchannel.

Spatial reuse field 2: This may generally mean a spatial reuse value of the highest 160 MHz subchannel.

Spatial reuse field 3 can be set equal to 1 and spatial reuse field 4 equal to 2. Alternatively, spatial reuse 3 and 4 may be reserved.

or

Spatial reuse field 1: This may generally mean a spatial reuse value of the lowest 80 MHz subchannel.

Spatial reuse field 2: In general, this may mean a spatial reuse value of a second lower 80 MHz subchannel.

Spatial reuse field 3: This may generally mean a spatial reuse value of a second higher 80 MHz subchannel.

Spatial reuse field 4: This may generally mean a spatial reuse value of the highest 80 MHz subchannel.

2 Spatial Reuse fields in U-SIG of EHT TB (Sub-)PPDU i) 20 MHz:

The two spatial reuse fields may be configured by copying spatial reuse fields 1 and 2 of the trigger frame as they are. That is, it may have the same spatial reuse value and may mean a spatial reuse value corresponding to a 20 MHz channel.

ii) 40 MHz:

The two spatial reuse fields may be configured by copying spatial reuse fields 1 and 2 of the trigger frame as they are. That is, it may be as follows.

Spatial reuse field 1: This may generally mean a spatial reuse value of the lowest 20 MHz subchannel.

Spatial reuse field 2: This may generally mean a spatial reuse value of the highest 20 MHz subchannel. In addition, even when the TB PPDU is transmitted in the 2.4 GHz band, it may be set to the same value as Spatial reuse field 1. The reason is that since 40 MHz channelization overlaps in the 2.4 GHz band, it is impossible to determine which channelization was used by the OBSS STA that decoded the corresponding TB PPDU in a specific 20 MHz channel, so it is simply set to the same value.

iii) 80 MHz:

The two spatial reuse fields may be configured by duplicating spatial reuse fields 1 and 2 of the trigger frame as they are. That is, it may be as follows.

Spatial reuse field 1: In general, this may mean a spatial reuse value of the lowest 40 MHz subchannel.

Spatial reuse field 2: This may generally mean a spatial reuse value of the highest 40 MHz subchannel.

Or

The two spatial reuse fields can be configured by copying spatial reuse fields 1 and 3 of the trigger frame as they are or copying fields 2 and 4 as they are. Alternatively, you can select and copy one of the two values in each field as shown below. The selection criterion may be a large or small value.

Spatial reuse field 1: This may generally mean a spatial reuse value of the lowest or second lowest 20 MHz subchannel.

Spatial reuse field 2: This may generally mean a spatial reuse value of the highest or second highest 20 MHz subchannel.

or

The two spatial reuse fields can be defined differently for each 40 MHz (that is, the U-SIG configuration can be different for each 40 MHz). At 40 MHz, spatial reuse fields 3 and 4 of the trigger frame can be copied and configured as they are. That is, it may be as follows.

Spatial reuse field 1 at a low 40 MHz: This may generally mean a spatial reuse value of the lowest 20 MHz subchannel.

Spatial reuse field 2 at a low 40 MHz: This may generally mean a spatial reuse value of a second low 20 MHz subchannel.

Spatial reuse field 1 at high 40 MHz: This may generally mean a spatial reuse value of a second high 20 MHz subchannel.

Spatial reuse field 2 at high 40 MHz: This may generally mean a spatial reuse value of the highest 20 MHz subchannel.

iv) 160 MHz:

The two spatial reuse fields may be configured by copying spatial reuse fields 1 and 2 of the trigger frame as they are. That is, it may be as follows.

Spatial reuse field 1: This may generally mean a spatial reuse value of the lowest 80 MHz subchannel.

Spatial reuse field 2: This may generally mean a spatial reuse value of the highest 80 MHz subchannel.

or

The two spatial reuse fields can be configured by copying spatial reuse fields 1 and 3 of the trigger frame as they are or copying fields 2 and 4 as they are. Alternatively, you can select and copy one of the two values in each field as shown below. The selection criterion may be a large or small value.

Spatial reuse field 1: This may generally mean a spatial reuse value of the lowest or second lowest 40 MHz subchannel.

Spatial reuse field 2: This may generally mean the spatial reuse value of the highest or second highest 40 MHz subchannel.

or

The two spatial reuse fields can be defined differently for each 80 MHz (that is, the U-SIG configuration can be different for each 80 MHz). At 80 MHz, spatial reuse fields 3 and 4 of the trigger frame can be copied and configured as they are. That is, it may be as follows.

Spatial reuse field 1 at a low 80 MHz: This may generally mean a spatial reuse value of the lowest 40 MHz subchannel.

Spatial reuse field 2 at a low 80 MHz: This may generally mean a spatial reuse value of a second low 40 MHz subchannel.

Spatial reuse field 1 at high 80 MHz: This may generally mean a spatial reuse value of a second high 40 MHz subchannel.

Spatial reuse field 2 at high 80 MHz: This may generally mean a spatial reuse value of the highest 40 MHz subchannel.

v) 320 MHz:

The two spatial reuse fields may be configured by copying spatial reuse fields 1 and 2 of the trigger frame as they are. That is, it may be as follows.

Spatial reuse field 1: This may generally mean a spatial reuse value of the lowest 160 MHz subchannel.

Spatial reuse field 2: This may generally mean a spatial reuse value of the highest 160 MHz subchannel.

or

The two spatial reuse fields can be configured by copying spatial reuse fields 1 and 3 of the trigger frame as they are or copying fields 2 and 4 as they are. Alternatively, you can select and copy one of the two values in each field as shown below. The selection criterion may be a large or small value.

Spatial reuse field 1: This may generally mean a spatial reuse value of the lowest or second lowest 80 MHz subchannel.

Spatial reuse field 2: This may generally mean a spatial reuse value of the highest or second highest 80 MHz subchannel.

Or

The two spatial reuse fields can be defined differently for each 160 MHz (i.e., the U-SIG configuration can be different for each 160 MHz), and at a lower 160 MHz, the spatial reuse fields 1 and 2 of the trigger frame can be copied and configured as they are, at a high frequency of 160 MHz, spatial reuse fields 3 and 4 of the trigger frame can be copied and configured as they are. That is, it may be as follows.

Spatial reuse field 1 at a low 160 MHz: This may generally mean a spatial reuse value of the lowest 80 MHz subchannel.

Spatial reuse field 2 at a low 160 MHz: This may generally mean a spatial reuse value of a second low 80 MHz subchannel.

Spatial reuse field 1 at high 160 MHz: This may generally mean a spatial reuse value of a second high 80 MHz subchannel.

Spatial reuse field 2 at high 160 MHz: This may generally mean a spatial reuse value of the highest 80 MHz subchannel.

APPENDIX 3

2 Spatial Reuse fields in EHT Common Info field of Trigger frame i) 20 MHz:

The two spatial reuse fields may have the same spatial reuse value and may mean a spatial reuse value corresponding to a 20 MHz channel.

ii) 40 MHz:

Spatial reuse field 1: This may generally mean a spatial reuse value of the lowest 20 MHz subchannel.

Spatial reuse field 2: This may generally mean a spatial reuse value of the highest 20 MHz subchannel. In addition, even when the TB PPDU is transmitted in the 2.4 GHz band, it may be set to the same value as Spatial reuse field 1. The reason is that since 40 MHz channelization overlaps in the 2.4 GHz band, it is impossible to determine which channelization was used by the OBSS STA that decoded the corresponding TB PPDU in a specific 20 MHz channel, so it is simply set to the same value.

iii) 80 MHz:

Spatial reuse field 1: In general, this may mean a spatial reuse value of the lowest 40 MHz subchannel.

Spatial reuse field 2: This may generally mean a spatial reuse value of the highest 40 MHz subchannel.

iv) 160 MHz:

Spatial reuse field 1: This may generally mean a spatial reuse value of the lowest 80 MHz subchannel.

Spatial reuse field 2: This may generally mean a spatial reuse value of the highest 80 MHz subchannel.

v) 320 MHz:

Spatial reuse field 1: This may generally mean a spatial reuse value of the lowest 160 MHz subchannel.

Spatial reuse field 2: This may generally mean a spatial reuse value of the highest 160 MHz subchannel.

2 Spatial Reuse fields in U-SIG of EHT TB (Sub-)PPDU

Duplicate the 2 Spatial Reuse fields in the Trigger frame above as they are.

Figure 22:
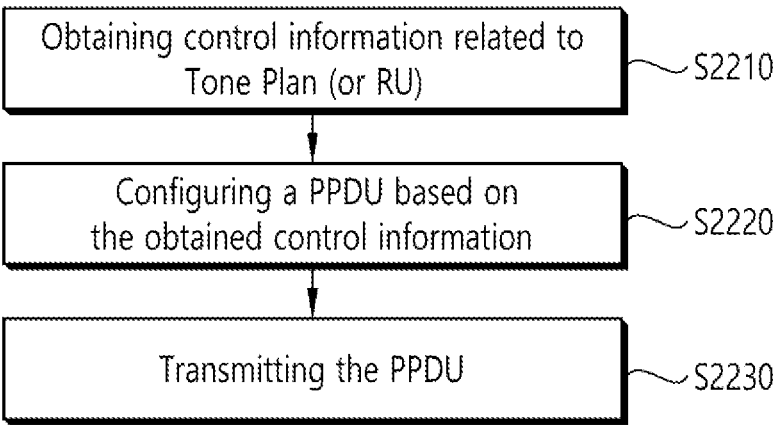
FIG. 22 is a process flow diagram illustrating the operation of the transmission device according to the present embodiment.

FIG. 22 is a process flow diagram illustrating the operation of the transmission device according to the present embodiment.

The example of FIG. 22 may be performed by a transmitting STA or a transmitting device (AP and/or non-AP STA).

Some of each step (or detailed sub-steps to be described later) in the example of FIG. 22 may be omitted or changed.

Through step S2210, the transmitting device (transmitting STA) may obtain information about the above-described tone plan. As described above, the information about the tone plan includes the size and location of the RU, control information related to the RU, information about a frequency band including the RU, information about an STA receiving the RU, and the like.

Through step S2220, the transmitting device may configure/generate a PPDU based on the acquired control information. A step of configuring/generating the PPDU may include a step of configuring/generating each field of the PPDU. That is, step S2220 includes a step of configuring the EHT-SIG field including control information about the tone plan. That is, step S2220 may include a step of configuring a field including control information (e.g. N bitmaps) indicating the size/position of the RU and/or a step of configuring a field including an identifier of an STA (e.g. AID) receiving the RU.

Also, step S2220 may include a step of generating an STF/LTF sequence transmitted through a specific RU. The STF/LTF sequence may be generated based on a preset STF generation sequence/LTF generation sequence.

Also, step S2220 may include a step of generating a data field (i.e., MPDU) transmitted through a specific RU.

The transmitting device may transmit the PPDU constructed through step S2220 to the receiving device based on step S2230.

While performing step S2230, the transmitting device may perform at least one of operations such as CSD, Spatial Mapping, IDFT/IFFT operation, and GI insertion.

A signal/field/sequence constructed according to the present specification may be transmitted in the form of FIG. 10.

Figure 23:
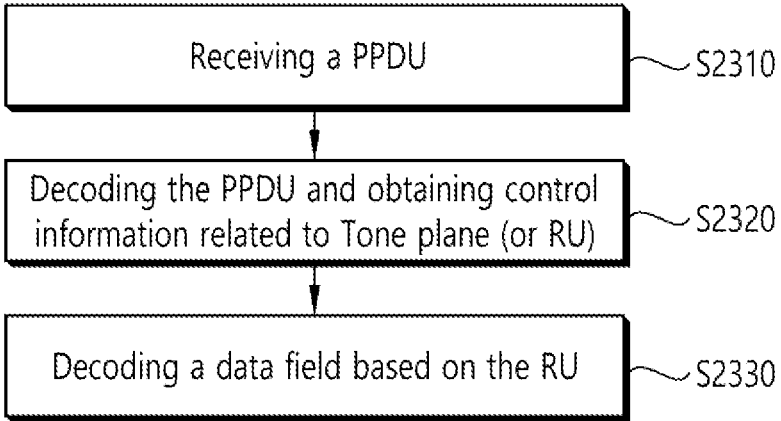
FIG. 23 is a process flow diagram illustrating the operation of the receiving device according to the present embodiment.

FIG. 23 is a process flow diagram illustrating the operation of the receiving device according to the present embodiment.

The aforementioned PPDU may be received according to the example of FIG. 22.

The example of FIG. 23 may be performed by a receiving STA or a receiving device (AP and/or non-AP STA).

Some of each step (or detailed sub-steps to be described later) in the example of FIG. 23 may be omitted.

The receiving device (receiving STA) may receive all or part of the PPDU through step S2310. The received signal may be in the form of FIG. 10.

The sub-step of step S2310 may be determined based on step S2230 of FIG. 22. That is, in step S2310, an operation of restoring the result of the CSD, Spatial Mapping, IDFT/IFFT operation, and GI insertion operation applied in step S2230 may be performed.

In step S2320, the receiving device may perform decoding on all/part of the PPDU. Also, the receiving device may obtain control information related to a tone plan (i.e., RU) from the decoded PPDU.

More specifically, the receiving device may decode the L-SIG and EHT-SIG of the PPDU based on the legacy STF/LTF and obtain information included in the L-SIG and EHT SIG fields. Information on various tone plans (i.e., RUs) described in this specification may be included in the EHT-SIG, and the receiving STA may obtain information on the tone plan (i.e., RU) through the EHT-SIG.

In step S2330, the receiving device may decode the remaining part of the PPDU based on information about the tone plan (i.e., RU) acquired through step S2320. For example, the receiving STA may decode the STF/LTF field of the PPDU based on information about one plan (i.e., RU). In addition, the receiving STA may decode the data field of the PPDU based on information about the tone plan (i.e., RU) and obtain the MPDU included in the data field.

In addition, the receiving device may perform a processing operation of transferring the data decoded through step S2330 to a higher layer (e.g., MAC layer). In addition, when generation of a signal is instructed from the upper layer to the PHY layer in response to data transmitted to the upper layer, a subsequent operation may be performed.

Hereinafter, the above-described embodiment will be described with reference to FIG. 1 to FIG. 23.

Figure 24:
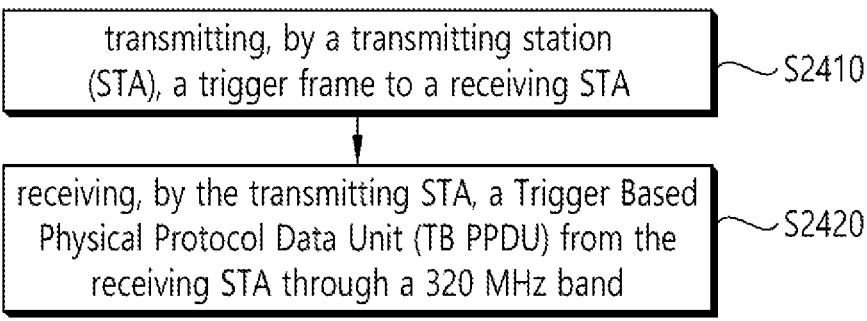
FIG. 24 is a flowchart illustrating a procedure for configuring a trigger frame and a TB PPDU supporting spatial reuse by an AP according to the present embodiment.

FIG. 24 is a flowchart illustrating a procedure for configuring a trigger frame and a TB PPDU supporting spatial reuse by an AP according to the present embodiment.

The example of FIG. 24 may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward compatibility with the 802.11ax system.

The example of FIG. 24 is performed by a transmitting STA, and the transmitting STA may correspond to an access point (AP). A receiving STA of FIG. 24 may correspond to a non-AP STA.

This embodiment proposes a method for configuring a trigger frame and a TB PPDU simultaneously supporting spatial reuse of an 802.11ax (or HE) WLAN system and an 802.11be (or EHT) WLAN system.

In step S2410, a transmitting station (STA) transmits a trigger frame to a receiving STA.

In step S2420, the transmitting STA receives a Trigger Based Physical Protocol Data Unit (TB PPDU) from the receiving STA through a 320 MHz band.

The trigger frame includes first and second non-High Throughput Duplicate (non-HT Dup) PPDUs. In the first non-HT Dup PPDU, all fields in a first 160 MHz channel having a lower frequency in the 320 MHz band are duplicated and transmitted every 20 MHz channel. In the second non-HT Dup PPDU, all fields in a second 160 MHz channel having a higher frequency in the 320 MHz band are duplicated and transmitted every 20 MHz channel. That is, the trigger frame is configured using a partial non-HT Dup PPDU, and the Partial non-HT Dup PPDU indicates a PPDU transmitted by using two or more Non-HT Dup PPDUs in a channel of 160 MHz or less. That is, this embodiment proposes a method in which two trigger frames are transmitted for each 160 MHz channel in the entire 320 MHz band.

The first non-HT Dup PPDU includes a first common information field and a first special user information field, and the second non-HT Dup PPDU includes a second common information field and a second special user information field.

Structures of the first and second non-HT Dup PPDUs are specifically as follows.

The first common information field includes first to fourth spatial reuse fields, and the second common information field includes fifth to eighth spatial reuse fields. The first special user information field includes ninth and tenth spatial reuse fields, and the second special user information field includes eleventh and twelfth spatial reuse fields.

This embodiment assumes a situation in which the trigger frame triggers the EHT TB PPDU. The first and second common information fields are EHT variant Common Info fields, and each includes four spatial reuse fields (HSR1, HSR2, HSR3, and HSR4). The four spatial reuse fields (HSR1, HSR2, HSR3, and HSR4) are defined for spatial reuse of an OBSS HE STA. The first and second special user information fields are included in the trigger frame when an Association Identifier (AID) is 2007, and each includes two spatial reuse fields (ESR1 and ESR2). The two spatial reuse fields (ESR1 and ESR2) are defined for spatial reuse of an OBSS EHT STA.

Since the first and second non-HT Dup PPDUs included in the trigger frame are configured differently for each 160 MHz channel, when the TB PPDU is a Trigger Based Aggregated-Physical Protocol Data Unit (TB A-PPDU) in which a High Efficiency (HE) TB PPDU and an Extreme High Throughput (EHT) TB PPDU are aggregated, since the trigger frame can indicate the HE TB PPDU and the EHT TB PPDU, respectively, there is an effect that structurally efficient configuration is possible. In addition, since the maximum bandwidth supported by the HE STA is 160 MHz, considering this, a structure of a trigger frame using a partial non-HT Dup PPDU in a 160 MHz channel or less may be preferable.

However, a value of the eleventh spatial reuse field is set equal to a value of the ninth spatial reuse field. A value of the twelfth spatial reuse field is set equal to a value of the tenth spatial reuse field. That is, the special user information field may be identically set for the first and second non-HT Dup PPDUs.

The first to fourth spatial reuse fields are set to values of the ninth and eleventh spatial reuse fields (HSR1=HSR2=HSR3=HSR4=ESR1). The fifth to eighth spatial reuse fields are set to values of the tenth and twelfth spatial reuse fields (HSR1=HSR2=HSR3=HSR4=ESR2). As a result, the spatial reuse field included in the common information field can be set using all values (ESR1, ESR2) of the spatial reuse field included in the special user information field. Therefore, it is possible to improve overall throughput and efficiency by enabling spatial reuse of the OBSS HE STA according to the ESR value.

The first non-HT Dup PPDU may include a first legacy-short training field (L-STF), a first legacy-long training field (L-LTF), a first legacy-signal (L-SIG), and a first data field. The second non-HT Dup PPDU may include a second L-STF, a second L-LTF, a second L-SIG, and a second data field.

The first data field may include the first common information field and the first special user information field. The second data field may include the second common information field and the second special user information field. A common information field and a special user information field (+user information field) corresponding to the MAC layer of the trigger frame may be included in the data field of the PHY layer.

The first L-STF, the first L-LTF, the first L-SIG and the first data field may be duplicated and transmitted every 20 MHz channel. The second L-STF, the second L-LTF, the second L-SIG, and the second data field may be duplicated and transmitted every 20 MHz channel.

A value of the first spatial reuse field may be a spatial reuse value for a first 40 MHz subchannel having the lowest frequency in the first 160 MHz channel. A value of the second spatial reuse field may be a spatial reuse value for a second 40 MHz subchannel having a second lowest frequency in the first 160 MHz channel. A value of the third spatial reuse field may be a spatial reuse value for a third 40 MHz subchannel having a second highest frequency in the first 160 MHz channel. A value of the fourth spatial reuse field may be a spatial reuse value for a fourth 40 MHz subchannel having the highest frequency in the first 160 MHz channel.

A value of the fifth spatial reuse field may be a spatial reuse value for a fifth 40 MHz subchannel having the lowest frequency in the second 160 MHz channel. A value of the sixth spatial reuse field may be a spatial reuse value for a sixth 40 MHz subchannel having a second lowest frequency in the second 160 MHz channel. A value of the seventh spatial reuse field may be a spatial reuse value for a seventh 40 MHz subchannel having a second highest frequency in the second 160 MHz channel. A value of the eighth spatial reuse field may be a spatial reuse value for an eighth 40 MHz subchannel having the highest frequency in the second 160 MHz channel.

The values of the ninth and eleventh spatial reuse fields may be spatial reuse values for the first 160 MHz channel (160 MHz channel having a low frequency in the 320 MHz band). The values of the tenth and twelfth spatial reuse fields may be spatial reuse values for the second 160 MHz channel (160 MHz channel having a high frequency in the 320 MHz band).

The spatial reuse value for the first 40 MHz subchannel may be a value used to calculate transmit power accessible by an Overlapping Basic Service Set (OBSS) High Efficiency (HE) STA for the first 40 MHz subchannel. The spatial reuse value for the second 40 MHz subchannel may be a value used to calculate transmit power accessible by the OBSS HE STA for the second 40 MHz subchannel. The spatial reuse value for the third 40 MHz subchannel may be a value used to calculate transmit power accessible by the OBSS HE STA for the third 40 MHz subchannel. The spatial reuse value for the fourth 40 MHz subchannel may be a value used to calculate transmit power accessible by the OBSS HE STA for the fourth 40 MHz subchannel.

The spatial reuse value for the fifth 40 MHz subchannel may be a value used to calculate transmit power accessible by the OBSS HE STA for the fifth 40 MHz subchannel. The spatial reuse value for the sixth 40 MHz subchannel may be a value used to calculate transmit power accessible by the OBSS HE STA for the sixth 40 MHz subchannel. The spatial reuse value for the seventh 40 MHz subchannel may be a value used to calculate transmit power accessible by the OBSS HE STA for the seventh 40 MHz subchannel. The spatial reuse value for the eighth 40 MHz subchannel may be a value used to calculate transmit power accessible by the OBSS HE STA for the eighth 40 MHz subchannel.

The spatial reuse value for the first 160 MHz subchannel may be a value used to calculate transmit power accessible by an OBSS Extremely High Throughput (EHT) STA for the first 160 MHz subchannel. The spatial reuse value for the second 160 MHz subchannel may be a value used to calculate transmit power accessible by the OBSS EHT STA for the second 160 MHz subchannel.

The first and second common information fields may include a first bandwidth field, and the first and second special user information fields may include a second bandwidth field. A band in which the TB PPDU is transmitted is set based on the first and second bandwidth fields. For example, if the first bandwidth field is set to 3 and the second bandwidth field is set to 2, the band through which the TB PPDU is transmitted may be 320-1 MHz. When the first bandwidth field is set to 3 and the second bandwidth field is set to 3, the band through which the TB PPDU is transmitted may be 320-2 MHz. It is assumed that the TB PPDU is an EHT TB PPDU. The first bandwidth field is a field indicating the bandwidth of the HE TB PPDU. By using the first and second bandwidth fields together, the bandwidth of the EHT TB PPDU can also be indicated.

The TB PPDU may include a Universal-Signal (U-SIG) field. The U-SIG field may include thirteenth and fourteenth spatial reuse fields. The thirteenth spatial reuse field may be configured by duplicating the ninth and eleventh spatial reuse fields (ESR1). The fourteenth spatial reuse field may be configured by duplicating the tenth and twelfth spatial reuse fields (ESR2).

The values of the first to fourteenth spatial reuse fields are normalized values for each 20 MHz subchannel in order to correct values according to band differences, or it may be values obtained by adding or subtracting a specific dBm value from the mean value and then changing to a maximum dBm value equal to or smaller than this value. For example, the specific dBm value may be 12 dB or 18 dB.

The first to fourteenth spatial reuse fields each consist of 4 bits and may use the same value as the value defined in the 802.11ax wireless LAN system (see Table 3).

According to this embodiment, the transmitting STA informs the OBSS STA of an allowable interference power value for a specific band (or specific channel) through a spatial reuse value, and the OBSS STA derives transmit power using the interference power value and the value of the AP TX Power subfield, and transmits a signal by performing spatial reuse in the specific band (or specific channel). Since the OBSS STA performs spatial reuse, the transmitting STA may not receive interference due to the OBSS STA when receiving the TB PPDU. That is, the present embodiment has an effect of improving throughput and efficiency by enabling spatial reuse of the OBSS STA and stably using transmission resources for a specific band without collision.

Figure 25:
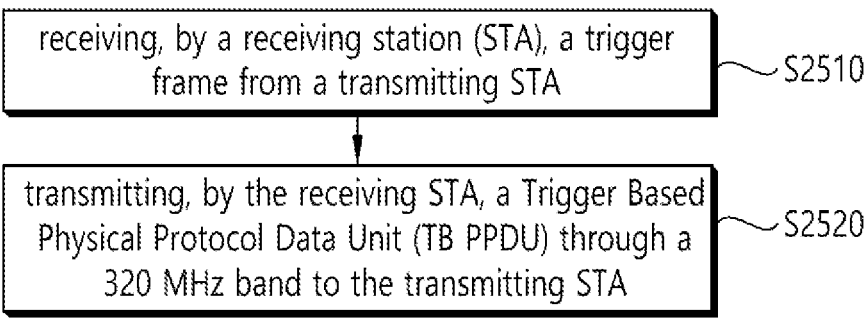
FIG. 25 is a flowchart illustrating a procedure for configuring a trigger frame and a TB PPDU supporting spatial reuse by an STA according to the present embodiment.

FIG. 25 is a flowchart illustrating a procedure for configuring a trigger frame and a TB PPDU supporting spatial reuse by an STA according to the present embodiment.

The example of FIG. 25 may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward compatibility with the 802.11ax system.

The example of FIG. 25 may be performed by a receiving STA, and the receiving STA may correspond to a non-AP STA. A transmitting STA of FIG. 25 may correspond to an access point (AP).

This embodiment proposes a method for configuring a trigger frame and a TB PPDU simultaneously supporting spatial reuse of an 802.11ax (or HE) WLAN system and an 802.11be (or EHT) WLAN system.

In step S2510, a receiving station (STA) receives a trigger frame from a transmitting STA.

In step S2520, the receiving STA transmits a Trigger Based Physical Protocol Data Unit (TB PPDU) to the transmitting STA through a preset frequency band.

The trigger frame includes first and second non-High Throughput Duplicate (non-HT Dup) PPDUs. In the first non-HT Dup PPDU, all fields in a first 160 MHz channel having a lower frequency in the 320 MHz band are duplicated and transmitted every 20 MHz channel. In the second non-HT Dup PPDU, all fields in a second 160 MHz channel having a higher frequency in the 320 MHz band are duplicated and transmitted every 20 MHz channel. That is, the trigger frame is configured using a partial non-HT Dup PPDU, and the Partial non-HT Dup PPDU indicates a PPDU transmitted by using two or more Non-HT Dup PPDUs in a channel of 160 MHz or less. That is, this embodiment proposes a method in which two trigger frames are transmitted for each 160 MHz channel in the entire 320 MHz band.

The first non-HT Dup PPDU includes a first common information field and a first special user information field, and the second non-HT Dup PPDU includes a second common information field and a second special user information field.

Structures of the first and second non-HT Dup PPDUs are specifically as follows.

The first common information field includes first to fourth spatial reuse fields, and the second common information field includes fifth to eighth spatial reuse fields. The first special user information field includes ninth and tenth spatial reuse fields, and the second special user information field includes eleventh and twelfth spatial reuse fields.

This embodiment assumes a situation in which the trigger frame triggers the EHT TB PPDU. The first and second common information fields are EHT variant Common Info fields, and each includes four spatial reuse fields (HSR1, HSR2, HSR3, and HSR4). The four spatial reuse fields (HSR1, HSR2, HSR3, and HSR4) are defined for spatial reuse of an OBSS HE STA. The first and second special user information fields are included in the trigger frame when an Association Identifier (AID) is 2007, and each includes two spatial reuse fields (ESR1 and ESR2). The two spatial reuse fields (ESR1 and ESR2) are defined for spatial reuse of an OBSS EHT STA.

Since the first and second non-HT Dup PPDUs included in the trigger frame are configured differently for each 160 MHz channel, when the TB PPDU is a Trigger Based Aggregated-Physical Protocol Data Unit (TB A-PPDU) in which a High Efficiency (HE) TB PPDU and an Extreme High Throughput (EHT) TB PPDU are aggregated, since the trigger frame can indicate the HE TB PPDU and the EHT TB PPDU, respectively, there is an effect that structurally efficient configuration is possible. In addition, since the maximum bandwidth supported by the HE STA is 160 MHz, considering this, a structure of a trigger frame using a partial non-HT Dup PPDU in a 160 MHz channel or less may be preferable.

However, a value of the eleventh spatial reuse field is set equal to a value of the ninth spatial reuse field. A value of the twelfth spatial reuse field is set equal to a value of the tenth spatial reuse field. That is, the special user information field may be identically set for the first and second non-HT Dup PPDUs.

The first to fourth spatial reuse fields are set to values of the ninth and eleventh spatial reuse fields (HSR1=HSR2=HSR3=HSR4=ESR1). The fifth to eighth spatial reuse fields are set to values of the tenth and twelfth spatial reuse fields (HSR1=HSR2=HSR3=HSR4=ESR2). As a result, the spatial reuse field included in the common information field can be set using all values (ESR1, ESR2) of the spatial reuse field included in the special user information field. Therefore, it is possible to improve overall throughput and efficiency by enabling spatial reuse of the OBSS HE STA according to the ESR value.

The first non-HT Dup PPDU may include a first legacy-short training field (L-STF), a first legacy-long training field (L-LTF), a first legacy-signal (L-SIG), and a first data field. The second non-HT Dup PPDU may include a second L-STF, a second L-LTF, a second L-SIG, and a second data field.

The first data field may include the first common information field and the first special user information field. The second data field may include the second common information field and the second special user information field. A common information field and a special user information field (+user information field) corresponding to the MAC layer of the trigger frame may be included in the data field of the PHY layer.

The first L-STF, the first L-LTF, the first L-SIG and the first data field may be duplicated and transmitted every 20 MHz channel. The second L-STF, the second L-LTF, the second L-SIG, and the second data field may be duplicated and transmitted every 20 MHz channel.

A value of the first spatial reuse field may be a spatial reuse value for a first 40 MHz subchannel having the lowest frequency in the first 160 MHz channel. A value of the second spatial reuse field may be a spatial reuse value for a second 40 MHz subchannel having a second lowest frequency in the first 160 MHz channel. A value of the third spatial reuse field may be a spatial reuse value for a third 40 MHz subchannel having a second highest frequency in the first 160 MHz channel. A value of the fourth spatial reuse field may be a spatial reuse value for a fourth 40 MHz subchannel having the highest frequency in the first 160 MHz channel.

A value of the fifth spatial reuse field may be a spatial reuse value for a fifth 40 MHz subchannel having the lowest frequency in the second 160 MHz channel. A value of the sixth spatial reuse field may be a spatial reuse value for a sixth 40 MHz subchannel having a second lowest frequency in the second 160 MHz channel. A value of the seventh spatial reuse field may be a spatial reuse value for a seventh 40 MHz subchannel having a second highest frequency in the second 160 MHz channel. A value of the eighth spatial reuse field may be a spatial reuse value for an eighth 40 MHz subchannel having the highest frequency in the second 160 MHz channel.

The values of the ninth and eleventh spatial reuse fields may be spatial reuse values for the first 160 MHz channel (160 MHz channel having a low frequency in the 320 MHz band). The values of the tenth and twelfth spatial reuse fields may be spatial reuse values for the second 160 MHz channel (160 MHz channel having a high frequency in the 320 MHz band).

The spatial reuse value for the first 40 MHz subchannel may be a value used to calculate transmit power accessible by an Overlapping Basic Service Set (OBSS) High Efficiency (HE) STA for the first 40 MHz subchannel. The spatial reuse value for the second 40 MHz subchannel may be a value used to calculate transmit power accessible by the OBSS HE STA for the second 40 MHz subchannel. The spatial reuse value for the third 40 MHz subchannel may be a value used to calculate transmit power accessible by the OBSS HE STA for the third 40 MHz subchannel. The spatial reuse value for the fourth 40 MHz subchannel may be a value used to calculate transmit power accessible by the OBSS HE STA for the fourth 40 MHz subchannel.

The spatial reuse value for the fifth 40 MHz subchannel may be a value used to calculate transmit power accessible by the OBSS HE STA for the fifth 40 MHz subchannel. The spatial reuse value for the sixth 40 MHz subchannel may be a value used to calculate transmit power accessible by the OBSS HE STA for the sixth 40 MHz subchannel. The spatial reuse value for the seventh 40 MHz subchannel may be a value used to calculate transmit power accessible by the OBSS HE STA for the seventh 40 MHz subchannel. The spatial reuse value for the eighth 40 MHz subchannel may be a value used to calculate transmit power accessible by the OBSS HE STA for the eighth 40 MHz subchannel.

The spatial reuse value for the first 160 MHz subchannel may be a value used to calculate transmit power accessible by an OBSS Extremely High Throughput (EHT) STA for the first 160 MHz subchannel. The spatial reuse value for the second 160 MHz subchannel may be a value used to calculate transmit power accessible by the OBSS EHT STA for the second 160 MHz subchannel.

The first and second common information fields may include a first bandwidth field, and the first and second special user information fields may include a second bandwidth field. A band in which the TB PPDU is transmitted is set based on the first and second bandwidth fields. For example, if the first bandwidth field is set to 3 and the second bandwidth field is set to 2, the band through which the TB PPDU is transmitted may be 320-1 MHz. When the first bandwidth field is set to 3 and the second bandwidth field is set to 3, the band through which the TB PPDU is transmitted may be 320-2 MHz. It is assumed that the TB PPDU is an EHT TB PPDU. The first bandwidth field is a field indicating the bandwidth of the HE TB PPDU. By using the first and second bandwidth fields together, the bandwidth of the EHT TB PPDU can also be indicated.

The TB PPDU may include a Universal-Signal (U-SIG) field. The U-SIG field may include thirteenth and fourteenth spatial reuse fields. The thirteenth spatial reuse field may be configured by duplicating the ninth and eleventh spatial reuse fields (ESR1). The fourteenth spatial reuse field may be configured by duplicating the tenth and twelfth spatial reuse fields (ESR2).

The values of the first to fourteenth spatial reuse fields are normalized values for each 20 MHz subchannel in order to correct values according to band differences, or it may be values obtained by adding or subtracting a specific dBm value from the mean value and then changing to a maximum dBm value equal to or smaller than this value. For example, the specific dBm value may be 12 dB or 18 dB.

The first to fourteenth spatial reuse fields each consist of 4 bits and may use the same value as the value defined in the 802.11ax wireless LAN system (see Table 3).

According to this embodiment, the transmitting STA informs the OBSS STA of an allowable interference power value for a specific band (or specific channel) through a spatial reuse value, and the OBSS STA derives transmit power using the interference power value and the value of the AP TX Power subfield, and transmits a signal by performing spatial reuse in the specific band (or specific channel). Since the OBSS STA performs spatial reuse, the transmitting STA may not receive interference due to the OBSS STA when receiving the TB PPDU. That is, the present embodiment has an effect of improving throughput and efficiency by enabling spatial reuse of the OBSS STA and stably using transmission resources for a specific band without collision.

4. Device Configuration

The technical features of the present disclosure may be applied to various devices and methods. For example, the technical features of the present disclosure may be performed/supported through the device(s) of FIG. 1 and/or FIG. 11. For example, the technical features of the present disclosure may be applied to only part of FIG. 1 and/or FIG. 11. For example, the technical features of the present disclosure may be implemented based on the processing chip(s) 114 and 124 of FIG. 1, or implemented based on the processor(s) 111 and 121 and the memory(s) 112 and 122, or implemented based on the processor 610 and the memory 620 of FIG. 11. For example, the device according to the present disclosure receives a trigger frame from a transmitting station (STA); and transmits a Trigger Based Physical Protocol Data Unit (TB PPDU) through a 320 MHz band to the transmitting STA.

The technical features of the present disclosure may be implemented based on a computer readable medium (CRM). For example, a CRM according to the present disclosure is at least one computer readable medium including instructions designed to be executed by at least one processor.

The CRM may store instructions that perform operations including receiving a trigger frame from a transmitting station (STA); and transmitting a Trigger Based Physical Protocol Data Unit (TB PPDU) through a 320 MHz band to the transmitting STA. At least one processor may execute the instructions stored in the CRM according to the present disclosure. At least one processor related to the CRM of the present disclosure may be the processor 111, 121 of FIG. 1, the processing chip 114, 124 of FIG. 1, or the processor 610 of FIG. 11. Meanwhile, the CRM of the present disclosure may be the memory 112, 122 of FIG. 1, the memory 620 of FIG. 11, or a separate external memory/storage medium/disk.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a wireless local area network (WLAN) system, the method comprising:

receiving, by a receiving station (STA), a trigger frame from a transmitting STA; and transmitting, by the receiving STA, a Trigger Based Physical Protocol Data Unit (TB PPDU) through a 320 MHz band to the transmitting STA, wherein the trigger frame includes first and second non-High Throughput Duplicate (non- HT Dup) PPDUs, wherein in the first non-HT Dup PPDU, all fields in a first 160 MHz subchannel having a lower frequency in the 320 MHz band are duplicated and transmitted every 20 MHz channel, wherein in the second non-HT Dup PPDU, all fields in a second 160 MHz subchannel having a higher frequency in the 320 MHz band are duplicated and transmitted every 20 MHz channel, wherein the first non-HT Dup PPDU includes a first common information field and a first special user information field;

wherein the second non-HT Dup PPDU includes a second common information field and a second special user information field;

wherein the first common information field includes first to fourth spatial reuse fields which are defined for spatial reuse of an Overlapping Basic Service Set (OBSS) High Efficiency (HE) STA, wherein the second common information field includes fifth to eighth spatial reuse fields which are defined for the spatial reuse of the OBSS HE STA, wherein the first special user information field includes ninth and tenth spatial reuse fields which are defined for spatial reuse of an OBSS Extremely High Throughput (EHT) STA, wherein the second special user information field includes eleventh and twelfth spatial reuse fields which are defined for the spatial reuse of the OBSS EHT STA, wherein the first to fourth spatial reuse fields are set to a value of the ninth spatial reuse field, wherein the fifth to eighth spatial reuse fields are set to a value of the tenth spatial reuse field, wherein a value of the eleventh spatial reuse field is set equal to the value of the ninth spatial reuse field, wherein a value of the twelfth spatial reuse field is set equal to the value of the tenth spatial reuse field, wherein an interference power value for the first 160 MHz subchannel is obtained by the OBSS HE STA based on the value of the ninth spatial reuse, wherein the spatial reuse of the OBSS HE STA is performed in the first 160 MHz subchannel based on transmit power derived from the interference power value for the first 160 MHz subchannel, wherein an interference power value for the second 160 MHz subchannel is obtained by the OBSS HE STA based on the value of the tenth spatial reuse, and wherein the spatial reuse of the OBSS HE STA is performed in the second 160 MHz subchannel based on transmit power derived from the interference power value for the second 160 MHz subchannel.

2. The method of claim 1, wherein the first non-HT Dup PPDU includes a first legacy-short training field (L-STF), a first legacy-long training field (L-LTF), a first legacy- signal (L-SIG), and a first data field, wherein the second non-HT Dup PPDU includes a second L-STF, a second L-LTF, a second L-SIG, and a second data field, wherein the first data field includes the first common information field and the first special user information field, wherein the second data field includes the second common information field and the second special user information field, wherein the first L-STF, the first L-LTF, the first L-SIG and the first data field are duplicated and transmitted every 20 MHz channel, wherein the second L-STF, the second L-LTF, the second L-SIG, and the second data field are duplicated and transmitted every 20 MHz channel.

3. The method of claim 1, wherein a value of the first spatial reuse field is a spatial reuse value for a first 40 MHz subchannel having the lowest frequency in the first 160 MHz subchannel, wherein a value of the second spatial reuse field is a spatial reuse value for a second 40 MHz subchannel having a second lowest frequency in the first 160 MHz subchannel, wherein a value of the third spatial reuse field is a spatial reuse value for a third 40 MHz subchannel having a second highest frequency in the first 160 MHz subchannel;

wherein a value of the fourth spatial reuse field is a spatial reuse value for a fourth 40 MHz subchannel having the highest frequency in the first 160 MHz subchannel, wherein a value of the fifth spatial reuse field is a spatial reuse value for a fifth 40 MHz subchannel having the lowest frequency in the second 160 MHz subchannel, wherein a value of the sixth spatial reuse field is a spatial reuse value for a sixth 40 MHz subchannel having a second lowest frequency in the second 160 MHz subchannel, wherein a value of the seventh spatial reuse field is a spatial reuse value for a seventh 40 MHz subchannel having a second highest frequency in the second 160 MHz subchannel, wherein a value of the eighth spatial reuse field is a spatial reuse value for an eighth 40 MHz subchannel having the highest frequency in the second 160 MHz subchannel, wherein the values of the ninth and eleventh spatial reuse fields are spatial reuse values for the first 160 MHz subchannel, wherein the values of the tenth and twelfth spatial reuse fields are spatial reuse values for the second 160 MHz subchannel.

4. The method of claim 3, wherein the spatial reuse value for the first 40 MHz subchannel is a value used to calculate transmit power accessible by an Overlapping Basic Service Set (OBSS) High Efficiency (HE) STA for the first 40 MHz subchannel, wherein the spatial reuse value for the second 40 MHz subchannel is a value used to calculate transmit power accessible by the OBSS HE STA for the second 40 MHz subchannel, wherein the spatial reuse value for the third 40 MHz subchannel is a value used to calculate transmit power accessible by the OBSS HE STA for the third 40 MHz subchannel, wherein the spatial reuse value for the fourth 40 MHz subchannel is a value used to calculate transmit power accessible by the OBSS HE STA for the fourth 40 MHz subchannel, wherein the spatial reuse value for the fifth 40 MHz subchannel is a value used to calculate transmit power accessible by the OBSS HE STA for the fifth 40 MHz subchannel, wherein the spatial reuse value for the sixth 40 MHz subchannel is a value used to calculate transmit power accessible by the OBSS HE STA for the sixth 40 MHz subchannel, wherein the spatial reuse value for the seventh 40 MHz subchannel is a value used to calculate transmit power accessible by the OBSS HE STA for the seventh 40 MHz subchannel, wherein the spatial reuse value for the eighth 40 MHz subchannel is a value used to calculate transmit power accessible by the OBSS HE STA for the eighth 40 MHz subchannel.

5. The method of claim 3, wherein the spatial reuse value for the first 160 MHz subchannel is a value used to calculate transmit power accessible by an OBSS Extremely High Throughput (EHT) STA for the first 160 MHz subchannel, wherein the spatial reuse value for the second 160 MHz subchannel is a value used to calculate transmit power accessible by the OBSS EHT STA for the second 160 MHz subchannel.

6. The method of claim 1, wherein the first and second common information fields include a first bandwidth field, and the first and second special user information fields include a second bandwidth field;

wherein a band in which the TB PPDU is transmitted is set based on the first and second bandwidth fields.

7. The method of claim 1, wherein the TB PPDU includes a Universal-Signal (U-SIG) field, wherein the U-SIG field includes thirteenth and fourteenth spatial reuse fields.

8. The method of claim 7, wherein the thirteenth spatial reuse field is configured by duplicating the ninth and eleventh spatial reuse fields, wherein the fourteenth spatial reuse field is configured by duplicating the tenth and twelfth spatial reuse fields.

9. A receiving station (STA) in a wireless local area network (WLAN) system, the receiving STA comprising:

a memory;

a transceiver; and a processor being operatively connected to the memory and the transceiver, wherein the processor is configured to:

receive a trigger frame from a transmitting STA; and transmit a Trigger Based Physical Protocol Data Unit (TB PPDU) through a 320 MHz band to the transmitting STA, wherein the trigger frame includes first and second non-High Throughput Duplicate (non- HT Dup) PPDUs, wherein in the first non-HT Dup PPDU, all fields in a first 160 MHz subchannel having a lower frequency in the 320 MHz band are duplicated and transmitted every 20 MHz channel, wherein in the second non-HT Dup PPDU, all fields in a second 160 MHz subchannel having a higher frequency in the 320 MHz band are duplicated and transmitted every 20 MHz channel, wherein the first non-HT Dup PPDU includes a first common information field and a first special user information field;

wherein the second non-HT Dup PPDU includes a second common information field and a second special user information field;

wherein the first common information field includes first to fourth spatial reuse fields which are defined for spatial reuse of an Overlapping Basic Service Set (OBSS) High Efficiency (HE) STA, wherein the second common information field includes fifth to eighth spatial reuse fields which are defined for the spatial reuse of the OBSS HE STA, wherein the first special user information field includes ninth and tenth spatial reuse fields which are defined for spatial reuse of an OBSS Extremely High Throughput (EHT) STA, wherein the second special user information field includes eleventh and twelfth spatial reuse fields which are defined for the spatial reuse of the OBSS EHT STA, wherein the first to fourth spatial reuse fields are set to a value of the ninth spatial reuse field, wherein the fifth to eighth spatial reuse fields are set to a value of the tenth spatial reuse field, wherein a value of the eleventh spatial reuse field is set equal to the value of the ninth spatial reuse field, wherein a value of the twelfth spatial reuse field is set equal to the value of the tenth spatial reuse field, wherein an interference power value for the first 160 MHz channel is obtained by the OBSS HE STA based on the value of the ninth spatial reuse, wherein the spatial reuse of the OBSS HE STA is performed in the first 160 MHz subchannel based on transmit power derived from the interference power value for the first 160 MHz channel, wherein an interference power value for the second 160 MHz subchannel is obtained by the OBSS HE STA based on the value of the tenth spatial reuse, and wherein the spatial reuse of the OBSS HE STA is performed in the second 160 MHz subchannel based on transmit power derived from the interference power value for the second 160 MHz subchannel.

10. A method in a wireless local area network (WLAN) system, the method comprising:

transmitting, by a transmitting station (STA), a trigger frame to a receiving STA; and receiving, by the transmitting STA, a Trigger Based Physical Protocol Data Unit (TB PPDU) from the receiving STA through a 320 MHz band, wherein the trigger frame includes first and second non-High Throughput Duplicate (non- HT Dup) PPDUs, wherein in the first non-HT Dup PPDU, all fields in a first 160 MHz subchannel having a lower frequency in the 320 MHz band are duplicated and transmitted every 20 MHz channel, wherein in the second non-HT Dup PPDU, all fields in a second 160 MHz subchannel having a higher frequency in the 320 MHz band are duplicated and transmitted every 20 MHz channel, wherein the first non-HT Dup PPDU includes a first common information field and a first special user information field;

wherein the second non-HT Dup PPDU includes a second common information field and a second special user information field;

wherein the first common information field includes first to fourth spatial reuse fields which are defined for spatial reuse of an Overlapping Basic Service Set (OBSS) High Efficiency (HE) STA, wherein the second common information field includes fifth to eighth spatial reuse fields which are defined for the spatial reuse of the OBSS HE STA, wherein the first special user information field includes ninth and tenth spatial reuse fields which are defined for spatial reuse of an OBSS Extremely High Throughput (EHT) STA, wherein the second special user information field includes eleventh and twelfth spatial reuse fields which are defined for the spatial reuse of the OBSS EHT STA, wherein the first to fourth spatial reuse fields are set to a value of the ninth spatial reuse field, wherein the fifth to eighth spatial reuse fields are set to a value of the tenth spatial reuse field, wherein a value of the eleventh spatial reuse field is set equal to the value of the ninth spatial reuse field, wherein a value of the twelfth spatial reuse field is set equal to the value of the tenth spatial reuse field, wherein an interference power value for the first 160 MHz subchannel is obtained by the OBSS HE STA based on the value of the ninth spatial reuse, wherein the spatial reuse of the OBSS HE STA is performed in the first 160 MHz subchannel based on transmit power derived from the interference power value for the first 160 MHz subchannel, wherein an interference power value for the second 160 MHz subchannel is obtained by the OBSS HE STA based on the value of the tenth spatial reuse, and wherein the spatial reuse of the OBSS HE STA is performed in the second 160 MHz subchannel based on transmit power derived from the interference power value for the second 160 MHz subchannel.

11. The method of claim 10, wherein the first non-HT Dup PPDU includes a first legacy-short training field (L-STF), a first legacy-long training field (L-LTF), a first legacy- signal (L-SIG), and a first data field, wherein the second non-HT Dup PPDU includes a second L-STF, a second L-LTF, a second L-SIG, and a second data field, wherein the first data field includes the first common information field and the first special user information field, wherein the second data field includes the second common information field and the second special user information field, wherein the first L-STF, the first L-LTF, the first L-SIG and the first data field are duplicated and transmitted every 20 MHz channel, wherein the second L-STF, the second L-LTF, the second L-SIG, and the second data field are duplicated and transmitted every 20 MHz channel.

12. The method of claim 10, wherein a value of the first spatial reuse field is a spatial reuse value for a first 40 MHz subchannel having the lowest frequency in the first 160 MHz subchannel, wherein a value of the second spatial reuse field is a spatial reuse value for a second 40 MHz subchannel having a second lowest frequency in the first 160 MHz subchannel, wherein a value of the third spatial reuse field is a spatial reuse value for a third 40 MHz subchannel having a second highest frequency in the first 160 MHz subchannel;

wherein a value of the fourth spatial reuse field is a spatial reuse value for a fourth 40 MHz subchannel having the highest frequency in the first 160 MHz subchannel, wherein a value of the fifth spatial reuse field is a spatial reuse value for a fifth 40 MHz subchannel having the lowest frequency in the second 160 MHz subchannel, wherein a value of the sixth spatial reuse field is a spatial reuse value for a sixth 40 MHz subchannel having a second lowest frequency in the second 160 MHz subchannel, wherein a value of the seventh spatial reuse field is a spatial reuse value for a seventh 40 MHz subchannel having a second highest frequency in the second 160 MHz subchannel, wherein a value of the eighth spatial reuse field is a spatial reuse value for an eighth 40 MHz subchannel having the highest frequency in the second 160 MHz subchannel, wherein the values of the ninth and eleventh spatial reuse fields are spatial reuse values for the first 160 MHz subchannel, wherein the values of the tenth and twelfth spatial reuse fields are spatial reuse values for the second 160 MHz subchannel.

13. The method of claim 12, wherein the spatial reuse value for the first 40 MHz subchannel is a value used to calculate transmit power accessible by an Overlapping Basic Service Set (OBSS) High Efficiency (HE) STA for the first 40 MHz subchannel, wherein the spatial reuse value for the second 40 MHz subchannel is a value used to calculate transmit power accessible by the OBSS HE STA for the second 40 MHz subchannel, wherein the spatial reuse value for the third 40 MHz subchannel is a value used to calculate transmit power accessible by the OBSS HE STA for the third 40 MHz subchannel, wherein the spatial reuse value for the fourth 40 MHz subchannel is a value used to calculate transmit power accessible by the OBSS HE STA for the fourth 40 MHz subchannel, wherein the spatial reuse value for the fifth 40 MHz subchannel is a value used to calculate transmit power accessible by the OBSS HE STA for the fifth 40 MHz subchannel, wherein the spatial reuse value for the sixth 40 MHz subchannel is a value used to calculate transmit power accessible by the OBSS HE STA for the sixth 40 MHz subchannel, wherein the spatial reuse value for the seventh 40 MHz subchannel is a value used to calculate transmit power accessible by the OBSS HE STA for the seventh 40 MHz subchannel, wherein the spatial reuse value for the eighth 40 MHz subchannel is a value used to calculate transmit power accessible by the OBSS HE STA for the eighth 40 MHz subchannel.

14. The method of claim 12, wherein the spatial reuse value for the first 160 MHz subchannel is a value used to calculate transmit power accessible by an OBSS Extremely High Throughput (EHT) STA for the first 160 MHz sub-channel, wherein the spatial reuse value for the second 160 MHz subchannel is a value used to calculate transmit power accessible by the OBSS EHT STA for the second 160 MHz subchannel.

15. The method of claim 10, wherein the first and second common information fields include a first bandwidth field, and the first and second special user information fields include a second bandwidth field;

wherein a band in which the TB PPDU is transmitted is set based on the first and second bandwidth fields.

\* \* \* \* \*